United States Patent
Pepper et al.

(10) Patent No.: US 10,452,768 B2
(45) Date of Patent: Oct. 22, 2019

(54) MANAGING SOURCE ANNOTATION METADATA

(75) Inventors: Timothy C. Pepper, Tigard, OR (US);
Eric B. Munson, Hillsboro, OR (US);
Gerrit Huizenga, Portland, OR (US);
Ramachandra N. Pai, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 2239 days.

(21) Appl. No.: 11/934,759

(22) Filed: Nov. 3, 2007

(65) Prior Publication Data

US 2009/0119576 A1    May 7, 2009

(51) Int. Cl.
*G06F 17/24* (2006.01)
*G06F 16/2457* (2019.01)

(52) U.S. Cl.
CPC ...... *G06F 17/241* (2013.01); *G06F 16/24573* (2019.01)

(58) Field of Classification Search
CPC ................................................. G06F 17/30587
See application file for complete search history.

(56) References Cited

U.S. PATENT DOCUMENTS

| | | | |
|---|---|---|---|
| 5,513,305 A | 4/1996 | Maghbouleh | |
| 6,675,370 B1 | 1/2004 | Sundaresan | |
| 6,735,591 B2 * | 5/2004 | Khan | |
| 7,076,788 B1 | 7/2006 | Lande et al. | |
| 7,127,675 B1 | 10/2006 | Kates et al. | |
| 7,130,863 B2 | 10/2006 | Diab | |
| 7,155,664 B1 | 12/2006 | Lee et al. | |
| 7,181,450 B2 * | 2/2007 | Malloy et al. | |
| 7,383,249 B2 * | 6/2008 | Groves | G06F 17/30371 |
| 8,495,099 B2 * | 7/2013 | Maim | 707/794 |
| 2002/0103789 A1 | 8/2002 | Turnbull et al. | 707/3 |
| 2003/0126235 A1 * | 7/2003 | Chandrasekar | G06F 17/30864 709/220 |
| 2004/0128276 A1 * | 7/2004 | Scanlon et al. | 707/1 |
| 2004/0199901 A1 | 10/2004 | Chapman | |
| 2004/0267798 A1 * | 12/2004 | Chatterjee et al. | 707/102 |
| 2005/0060688 A1 | 3/2005 | Kamalakantha | |
| 2005/0216891 A1 | 9/2005 | Sundararajan et al. | |
| 2005/0267871 A1 * | 12/2005 | Marchisio et al. | 707/3 |
| 2006/0074857 A1 * | 4/2006 | Etzold et al. | 707/3 |

(Continued)

OTHER PUBLICATIONS

Davor Gornik; use Rational Data Architect to Integrate Data Sources; pp. 1-10.*

(Continued)

*Primary Examiner* — Mariela Reyes
*Assistant Examiner* — Jermaine A Mincey
(74) *Attorney, Agent, or Firm* — Walter W. Duft

(57) ABSTRACT

A method, system and computer program product for managing source annotation metadata. The metadata management technique may include maintaining a set of metadata, maintaining data/metadata relationships between individual units of the metadata and individual units of the source data, and maintaining metadata/metadata relationships between individual units of the metadata. The metadata/metadata relationships define two or more intersecting search pathways through the metadata that intersect at one or more metadata units belonging to more than one search domain.

25 Claims, 19 Drawing Sheets

(56) References Cited

U.S. PATENT DOCUMENTS

| | | | |
|---|---|---|---|
| 2007/0033220 A1* | 2/2007 | Drucker et al. | 707/103 R |
| 2007/0043736 A1* | 2/2007 | Jain | 707/10 |
| 2007/0112859 A1* | 5/2007 | Joshi | 707/104.1 |
| 2007/0192361 A1* | 8/2007 | Rangadass | 707/103 R |
| 2007/0208711 A1* | 9/2007 | Rhoads et al. | 707/3 |
| 2007/0250528 A1* | 10/2007 | Ahs et al. | 707/102 |
| 2007/0250810 A1* | 10/2007 | Tittizer et al. | 717/110 |
| 2007/0271234 A1* | 11/2007 | Ravikiran | G06F 17/30194 |
| 2009/0083314 A1* | 3/2009 | Maim | 707/103 R |

OTHER PUBLICATIONS

IBM; Adminstration Guide for Federated Systems; 2006; p. 6.*
David Bearman; A Common Model to Support Interoperable Metadata; 199; D-Lib' vol. 5 No. 1; pp. 1-20.*
Yufei Tao; "Reverse kNN Search in Arbitary Dimensionality"; 2004; pp. 744-755 (Year: 2004).*

* cited by examiner

```
              foo.c 1     lock_t l;
2
3     int main(void) {
4
5     lock(&l);
6     do_something();
7     unlock(&l);
8     }
```

*FIG. 1*

```
              bar.c

.
  .
  .

13    lock(&l);
14    do_something_else();
15    unlock(&l);
  .
  .
  .
```

*FIG. 2*

MANAGING SOURCE ANNOTATION METADATA

BACKGROUND OF THE INVENTION

1. Field of the Invention

The present invention is directed to the annotation of source data to facilitate source data comprehension, particularly for software development. More particularly, the invention concerns the creation and organization of annotation information for source code and other types of source data.

2. Description of the Prior Art

By way of background, when a developer is added to a software project he/she is faced with the need to understand a large, complex code base. It is often helpful to describe functions, methods, or code blocks using more than just source code comments, such as state diagrams, flow charts, call graphs, control flow graphs, pseudo code, and/or a description of what the specified block accomplishes. Such annotation of source code (a type of metadata) is cumbersome because the annotation requires a technique for linking the metadata to discrete portions of the code, and for searching the metadata.

Existing annotation metadata solutions include simple text mark up languages for associating tags with annotation text. This is flat and does not easily allow multiple associations or dynamic viewing of those associations. Such solutions are analogous to a simple word processing document that allows one to add a "note" to text. This is essentially a one to one mapping and gives information that is supplemental (i.e., essentially a parenthetical reference), optional, and which does not necessarily stand on its own as an independent information source (without the underlying source code).

UML (Unified Modeling Language) modeling and associated code generation also results in the creation of annotation metadata, but this approach implies a directionality to the development process in which the design is completely documented in advance. Such solutions do not allow annotation information to be captured after the fact in order to add explanatory information related to the software implementation that is not captured normally in design specifications.

Thus, a problem space that is not properly addressed by the prior art is how to handle source annotation metadata in a meaningful way after it is created. Although tools exist for automatically generating annotation metadata, they are not specifically designed to manage the process of organizing this metadata in any meaningful way, associate it with ranges of the source code, or provide the flexibility to display different views of the results. The thinking in the art has been generally predicated on automated approaches to machine generation of annotation metadata (i.e., automated documentation) rather than on a way to store metadata so that it provides the most utility. The semantic analysis of code to understand "what it does" is a very complex problem that is not dealt with well by current metadata creation solutions that simply annotate lines of code with parenthetical information, as discussed above.

Accordingly, a need exists for an improved technique for annotating source code data. What is required is a solution that allows source code metadata to be created, organized, and searched in order to quickly obtain information about the underlying source code data. Rather than focusing on automated techniques for metadata generation, a new solution for finding expressive ways of organizing and managing such metadata would be desirable. An annotation technique having applicability to source data other than computer programming language source code would be of further benefit. Such alternative source data types could include natural language text, diagrams, maps and other graphical images, audio works, audio-visual works, and any other input data type capable of being annotated by way of media or encoding that can be stored and linked to facilitate human comprehension.

SUMMARY OF THE INVENTION

The foregoing problems are solved and an advance in the art is obtained by a method, system and computer program product for managing source annotation metadata. In one aspect, the metadata management technique includes maintaining a set of metadata, maintaining data/metadata relationships between individual units of the metadata and individual units of the source data, and maintaining metadata/metadata relationships between individual units of the metadata. The metadata/metadata relationships define two or more intersecting search pathways through the metadata that intersect at one or more metadata units belonging to more than one search domain.

According to exemplary disclosed embodiments, the data/metadata relationships may be arbitrarily defined and could include statically defined data/metadata relationships and dynamically defined data/metadata relationships based on regular expressions. The metadata/metadata relationships may also be arbitrarily defined. The metadata units may be maintained by metadata containers, each of which includes a context tag that defines one of the data/metadata relationships, a hierarchy tag that defines one of the metadata/metadata relationships, a category tag that represent an extension of the hierarchy tag and defines a category to which the metadata unit belongs, a custom tag that defines an additional metadata/metadata relationship, and data identifying the metadata unit. The metadata containers may be organized for searching the context tags, the hierarchy tags, the category tags and the custom tags. For example, the metadata containers may be organized in a database that maintains key indices on these tags. A metadata navigation interface may be provided by displaying the hierarchy tags and the custom tags for plural metadata containers as selectable items that can be selected to display the category tags, and wherein the category tags can be selected to display the metadata units, the source data or both.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 1 is a diagrammatic representation of an exemplary source code file;

FIG. 2 is a diagrammatic representation of another exemplary source code file;

DETAILED DESCRIPTION OF EXEMPLARY EMBODIMENTS

Introduction

Figure 3:
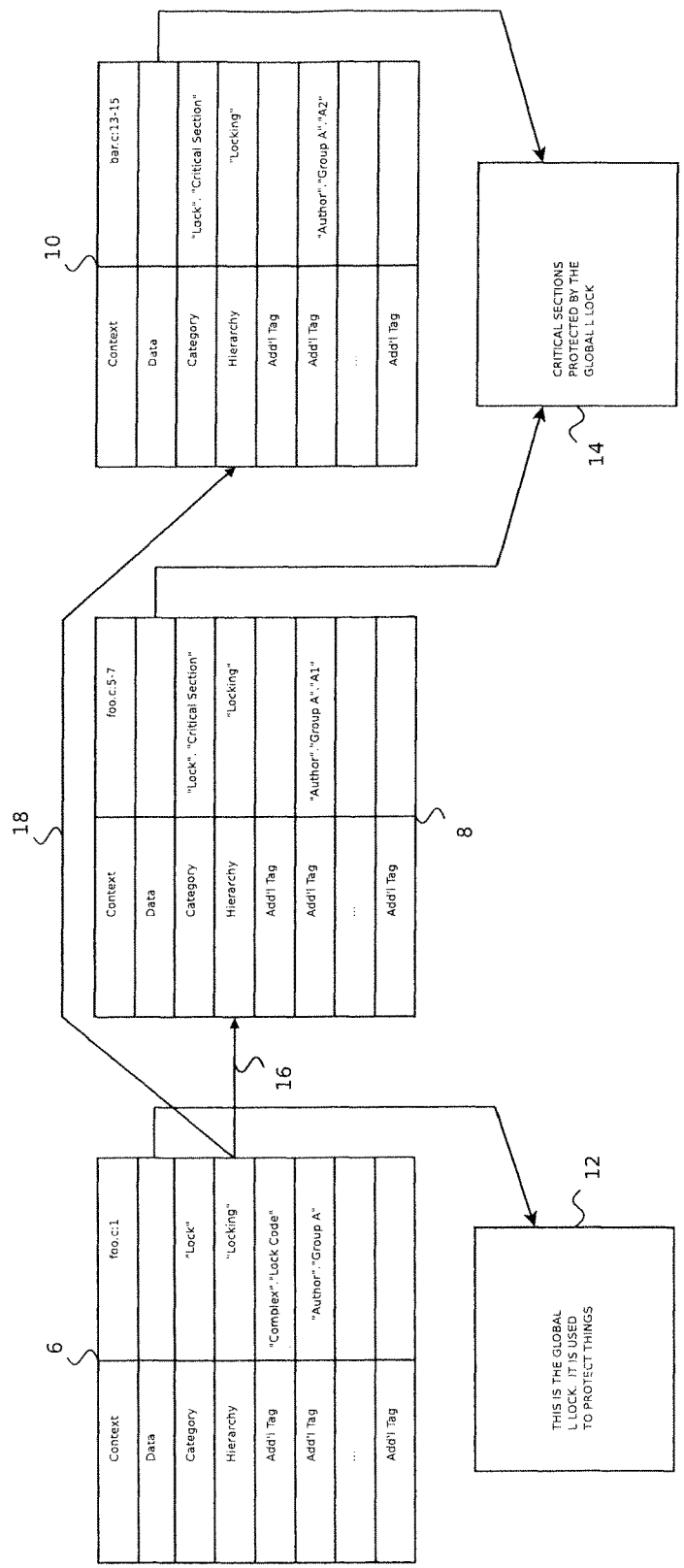
FIG. 3 is a diagrammatic representation of a set of exemplary metadata containers.

As described in more detail hereinafter by way of exemplary embodiments, an improved technique is provided for associating source data and descriptive annotation information about the source data (annotation metadata). These associations establish data/metadata relationships. Additional associations may be established between portions of the metadata itself. These associations establish metadata/metadata relationships that can be used to organize the metadata into metadata hierarchies and categories. The data/metadata and metadata/metadata relationships can be one-to-one, one-to-many and many-to-many, in any combination.

With respect to data/metadata relationships, metadata may be associated with one or more user-defined ranges and nested sub-ranges of source data, such as an entire software product, components or modules thereof, blocks of code, lines of code, byte ranges, files or functions, etc. Conversely, a particular item of source data could be associated with multiple metadata items, such as a set of metadata containing increasing depth of detail for the source data item. These data/metadata relationships may be statically defined and/or dynamically defined using regular expressions that are parsed as the metadata is searched or displayed. The latter technique allows a single unit of metadata to easily relate to multiple pieces of source data, and defers instantiation of the precise data/metadata relationship until metadata search/display time instead of at metadata creation time. Moreover, whereas a statically defined data/metadata relationship could break if the underlying source data changes, a dynamically defined data/metadata relationship will continue to be valid so long as the regular expression that defines it matches one or more source data elements.

With respect to metadata/metadata relationships, complex multidimensional associations may be established that allow many different pathways to be navigated through metadata hierarchies that are completely user-definable. These search pathways may intersect at metadata intersections that belong to more than one search domain. For example, a particular unit of metadata (e.g., a piece of metadata describing a specified software data structure) may lie in a first search domain that includes all data structures, a second search domain that includes all source code that is considered complex, and a third search domain that includes all source code maintained by a particular software group. Multiple metadata search domains may thus be created that allow the metadata (and the underlying source data) to be viewed from different aspects according to the interests and needs of the metadata consumer.

The metadata may be represented in any suitable fashion, including as a set of structures, objects or other units (metadata containers). Each such metadata container may include one or more context discriminant(s) that establish the data/metadata relationship(s) to which the metadata container belongs, one or more pieces of category or hierarchy information that establish the metadata/metadata relationships to which the metadata container belongs, and descriptive information that represents the metadata itself. This descriptive information can be stored in any desired fashion, including as a BLOB (Binary Large Object) pointed to by the metadata container. The information may be encoded in any desired information format, including plain text, an XML document, a bitmap, rich text, animation, a flow chart, pseudocode, a state diagram, etc.).

The metadata category/hierarchy information is used to view source data annotations at different elevations. Source data subject matter for which this type of metadata organization is advantageous include call graph hierarchies, files/directories, lock hierarchies and depth of descriptive detail. The latter could be used when multiple pieces of metadata are associated with a block of source data and are assigned a relative descriptiveness in order to allow summary vs. detail differentiation in the annotation. There can be any number of hierarchy levels. Metadata containers in a given hierarchy may be located by following the hierarchy. The metadata category represents the metadata hierarchy level at which information is being provided by a given metadata container. By way of example, for source data that comprises software code, categories to which metadata containers could be assigned might be locks, semaphores, Read-Copy Update (RCU), Virtual File System (VFS) acquire/release, sets of variables, users of specific functions, or code belonging to different subsystems or drivers.

Once the data/metadata and metadata/metadata relationships are established, a display mechanism may be invoked for alternating the display between the source data in its original form, the data with annotations (metadata) interleaved, only annotations, or combinations of the foregoing. This may be accomplished by selecting which metadata categories/hierarchies will be displayed and whether they will be displayed alone or with the source data. By way of example, if data display is not enabled globally, only the metadata that is selected might be displayed. For any metadata selected for display, the data range associated with it may be optionally displayed with the annotation, or it may be replaced by the annotation. The ability to enter the metadata information base from the data side may also be provided, such that metadata may be optionally displayed by selecting links or menu options interspersed in the source data itself.

The display mechanism includes a graphical user interface that may be used to navigate the metadata hierarchies and categories. By way of example, assume that the source code for a software program that uses locking has been annotated with descriptive information that specifies what each lock is designed to protect and their acquisition hierarchy. The display could be set to only show blocks of code which have locks in them and only show the locks and protected structures within those blocks. Mis-ordered locking could be highlighted automatically. With a few clicks of a mouse a complex source code base could be turned into a simpler representation of the concurrency protections and a reader could then gain insight visually as to how the locking is designed/implemented through a code path. This information would otherwise be obscured by the rest of the implementation embodied in the code.

The disclosed technique thus facilitates metadata storage, management and use, and provides such benefits as the ability to create dynamic views on categories and/or hierarchies of metadata in addition to or instead of the data. A rich information output may be created that supports capturing design and explanatory information at various hierarchical levels and allowing patterns, trends, themes, and other interactions within the underlying source data to be exposed.

Exemplary Embodiments

Turning now to drawing figures, wherein like reference numerals indicate like elements in all of the several views, examples of source annotation metadata management will be described using software source code as the source data. However, as described above in the "Background of the Invention" section, software source code is not the only type of source data for which the disclosed metadata management techniques could be used. As mentioned, other types of source data include, but are not limited to, natural language text, diagrams, maps and other graphical images, audio works, audio-visual works, and any other input data type capable of being annotated by way of media or encoding that can be stored and linked to facilitate human comprehension.

Thus, using software source code as an exemplary type of source data, FIG. 1 illustrates an exemplary source code file 2 named "foo.c." Line 1 of the source code file 2 declares a lock variable "1" that shall be referred to as the "global 1 lock." Lines 5-7 of the source code file 2 represent a critical section that is protected by this lock. FIG. 2 illustrates another exemplary source code file 4 named "bar.c." Lines 13-15 of the source code file 4 represent another critical section that is protected by the global 1 lock.

FIG. 3 illustrates a hierarchy of exemplary metadata containers 6, 8 and 10 that manage the metadata associated with the source code files 2 and 4. Each metadata container 6, 8 and 10 has several field/value combinations, namely, a fully user-definable context discriminant (e.g., byte ranges, code blocks, lines of code, functions, files, or regular expressions matching any of the foregoing), user-created descriptive information (metadata) related to the data, user-defined hierarchy/category tags, and optional user-created additional field/value pairs of an arbitrary nature.

In the metadata container 6, the context discriminant field labeled "Context" identifies one context discriminant, namely line 1 of the foo.c source code file 2. This creates a one-to-one data/metadata relationship between the metadata container 6 and line 1 of the foo.c file. If desired, additional context discriminants could be specified for the container 6. For example, the context discriminant field of the metadata container 6 could specify a list of context discriminants using an appropriate separator (e.g., a period) between each context discriminant. Thus, the context discriminant list "foo.c; foo.c:1" would establish a multi-dimensional one-to-many data/metadata relationship between the metadata container 6 and two portions of the source code data, namely, the entire foo.c source code file and line 1 of that file. The latter context represents a range of source code data that is nested within the former context. Jumping ahead in the drawing figures, this many-to-one data/metadata mapping can be seen in FIG. 11 (note the two data/metadata association lines extending from the metadata container (MDC) 6). Additional context discriminants could also be added to the metadata container 6 (or any other metadata container), depending on the metadata container's relevance to other sections of the source code.

Specifying a context discriminant in the foregoing manner represents a static definition of a data/metadata relationship. As described above, such relationships may also be dynamically defined using regular expressions. For example, instead of the context discriminant of the metadata container 6 specifying the file and line number of the global 1 lock, a regular expression that matches any location in the source code where the global 1 lock is defined may be declared. Thus, if the foo.c source code file 2 was edited so that the global 1 lock declaration was now on a different line, the dynamically defined context discriminant would still be valid. Moreover, if for some reason the global 1 lock was declared more than once, the dynamically defined context discriminant would evaluate to all such occurrences in the source code.

The descriptive information field labeled "Data" specifies the name or location (e.g., using a file name or a pointer) of a storage entity 12, such as a BLOB, that contains the actual metadata. In this example, the metadata in the storage entity 12 comprises text that informs the reader that line 1 of the foo.c source code file 2 is the global 1 lock, and provides descriptive information about this lock. As previously stated, the metadata could take any form, including but not limited to plain text, an XML document, a bitmap, rich text, animation, a flow chart, pseudocode, a state diagram, etc.).

The field labeled "Category" specifies that the metadata for the metadata container 6 is in the "Lock" category. The category field provides a convenient label that can be used to represent the metadata container 6 for the searching and display of metadata information (as in FIG. 5 below). It also represents an extension of the hierarchy field described below, allowing the metadata container 6 to represent a particular metadata category within a selected metadata hierarchy level.

The field labeled "Hierarchy" specifies that the metadata for the metadata container 6 is in the "Locking" Hierarchy. The hierarchy field represents one metadata/metadata relationship pathway (search domain) that allows metadata containers to be traversed during metadata searching and display. In particular, the pathway defined by the hierarchy fields of a set of metadata containers will usually represent a typical top-down hierarchy extending from top level metadata of a very general nature to low level metadata of a very detailed nature. As such, the hierarchy fields of a set of metadata containers will usually define a typical tree hierarchy of the type shown in FIG. 10 (see below). To facilitate metadata organization and searching, the hierarchy field value may be set forth as a full hierarchical path listing, similar to a file system directory path specification. This is illustrated in the custom tag fields described in the next paragraph, which use a "dot" notation to separate hierarchy levels. The reason this notation is not apparent in the "Locking" hierarchy field of the metadata container 6 is because the "Locking" hierarchy is a top level hierarchy, as will be seen below in connection with FIG. 5.

The remaining field/value pairs labeled "Add'1 Tag" are custom tag fields that are intended to be optionally filled in with information to create additional dimensions of metadata/metadata relationship, thereby establishing new metadata search domains. For example, in FIG. 3, a metadata administrator has added a tag to the metadata container 6 stating that the global 1 lock represents "Lock Code" in a "Complex" code search domain. The custom tag uses the above-mentioned "dot" notation to specify a full hierarchical path listing that pinpoints the location of the metadata container 6 within this custom search domain. The first value of the custom tag (i.e., "Complex") specifies the top level name of the domain. As its name implies, this domain pertains to all source code that is considered to be complex and provides an additional navigational pathway that facilitates the search and display of metadata for such source code. The "Lock Code" value indicates that the global 1 lock code whose metadata is provided by the container 6 is a subset of the code considered to be complex. Note that hierarchy path formats other than "dot" notation could also be used. Alternatively, instead of hierarchy path listings, metadata containers in a given hierarchical path could be linked together (e.g., using pointer entities) to establish the path relationships. A further custom tag of the metadata container 6 specifies that this container belongs to a top level search domain known as "Author" and is in a subset group of authors known as "Group A." This domain associates source code with particular software development teams. The custom tag indicates that software group A maintains the global 1 lock code.

The metadata container 8 is used for metadata pertaining to the critical section code of lines 5-7 of the foo.c source code file 2. Similarly, the metadata container 10 is used for metadata pertaining to the critical section code 13-15 of the bar.c source code file 4. The foregoing is indicated by the respective context fields of the metadata container 8 and 10. The data fields of the metadata containers 8 and 10 specify the name or location of a common storage entity 14, such as a BLOB, that contains the actual metadata for both metadata containers. Separate storage entities would be used if the metadata was different for each metadata container. In this example, the metadata informs the reader that lines 5-7 of the foo.c source code file 2 and lines 13-15 of the bar.c source code file 4 represent critical sections that are protected by the global 1 lock. The category field of the metadata containers 8 and 10 specifies that the metadata for both metadata containers is in a "Critical Section" subcategory of the "Lock" category (used for metadata container 6). This is indicated by the use of a "dot" notation that provides a precedence indicator specifying category precedence. The effect of this category precedence is visible in FIG. 5 (described below).

The hierarchy field of the metadata containers 8 and 10 specifies that the metadata for both metadata containers is in the "Locking" Hierarchy. The first custom tag field of the metadata containers 8 and 10 is empty because the associated source code is not considered to be complex. The second custom tag field of the metadata container 8 specifies that the source code associated with this container is maintained by section "A1" of software development "Group A." The second custom tag field of the metadata container 10 specifies that the source code associated with this container is maintained by section "A2" of software development "Group A."

The arrows labeled 16 and 18 in FIG. 3 illustrate how the category fields of the metadata containers 6, 8 and 10 provide the ability to extend the hierarchical fields. In particular, the arrows labeled 16 and 18 respectively show that the metadata containers 8 and 10 are related to the metadata container 6 because all are part of the "Locking" hierarchy. However, the metadata container 6 is in the higher precedence "Lock" category whereas the metadata containers 8 and 10 are in the lower precedence "Critical Section" subcategory of the "Lock" category. When a metadata search reaches the metadata container 6 and the global 1 lock metadata is encountered, it will be a simple matter using the hierarchy/category information to reach the metadata containers 8 and 10 to determine the critical sections that are protected by this lock.

Figure 4:
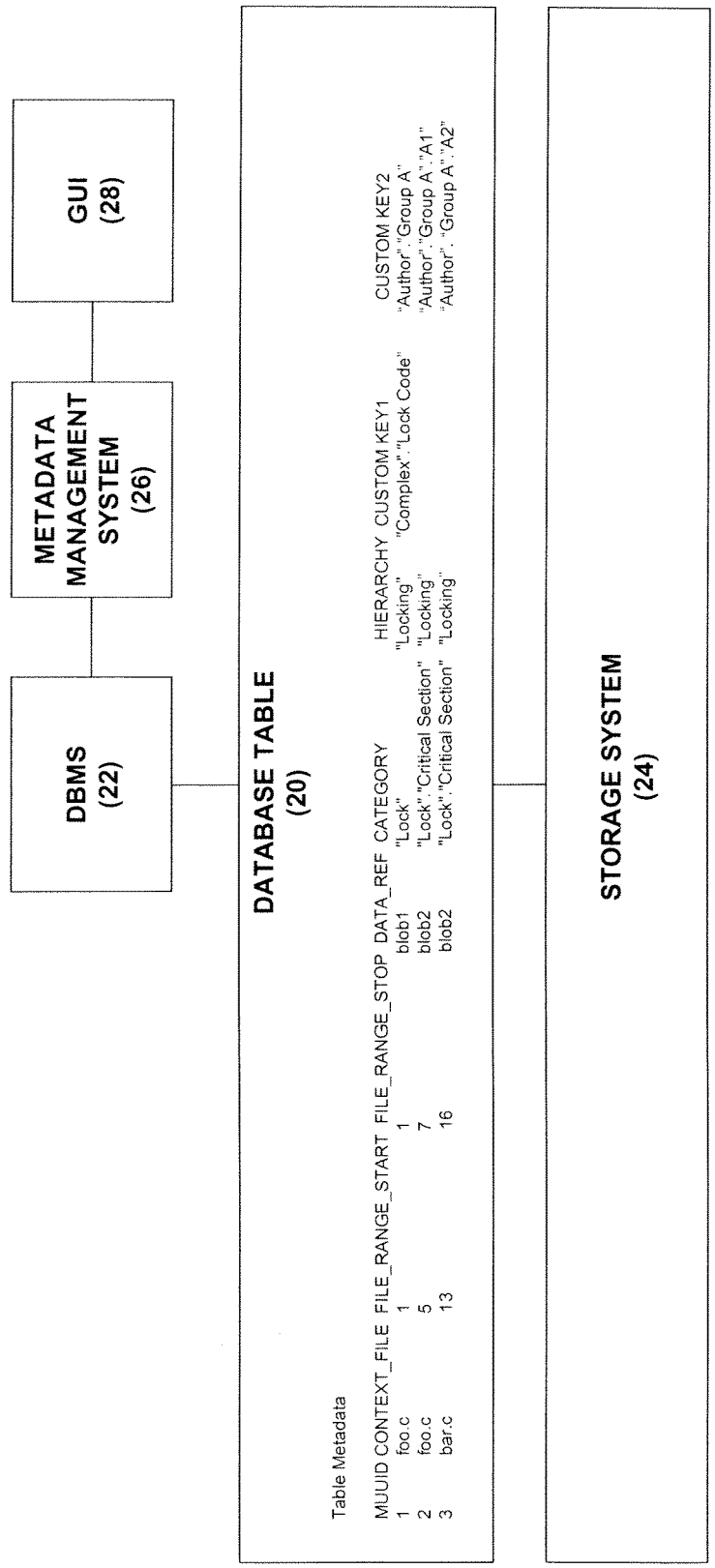
FIG. 4 is a block diagram showing an exemplary metadata management system and an associated database system and database table for storing metadata containers.

Turning now to FIG. 4, an exemplary technique is shown for storing the metadata containers 6, 8 and 10 using a database table 20 managed by a database management system 22. The database table 20 is part of a database that resides on a storage system 24. The database management system 22 may operate as a back end system on behalf of a front end metadata management system 26 that is accessed by way of a graphical user interface (GUI) 28. The interface 28 may be directly attached to the metadata management system 26 or it could be remotely attached thereto via a network or the like. Functions that are provided by the metadata management system 26 may include allowing a metadata administrator to (1) create metadata containers, (2) create data/metadata relationships by associating metadata to source data (e.g., by specifying the context determinants of metadata containers), and (3) create metadata/metadata relationships by assigning the metadata containers to hierarchies and categories. Another function of the metadata management system 26 is to allow persons who are studying the source data to conduct searches of the metadata and source data. If desired, the source data may be stored with the metadata on the storage system 24, or it may be stored separately on a different data storage resource (not shown). Exemplary implementations of the foregoing functions of the metadata management system 26 are described in more detail below.

The three database rows labeled "1," "2" and "3" of the table 20 respectively represent the metadata containers 6, 8 and 10. The left-most column of table 20 labeled "MUID" is a row identifier index that assigns an index number to each metadata container. To the right of this index, the remaining columns of the table 20 represent the field/value pairs of the metadata containers 6, 8 and 10. Each of these columns can be used as a search key for locating metadata. For the context field of FIG. 3, the file name, file range start and file range end values are specified. Alternatively, as described above, a regular expression could be specified in order to create a dynamic context discriminant. For the data field of FIG. 3, the names "Blob1" and "Blob2" are listed to respectively identify the metadata storage entities 12 and 14 of FIG. 3. The next two columns in the table 20 contain the values of the category and hierarchy fields of FIG. 3. The remaining columns correspond to the custom tag fields of FIG. 3. These fields are used as index keys for the custom search domains as described above. The database management system (DBMS) 22 may be implemented using any conventional software that supports database maintenance and searching. It should also be understood that other storage formats may be used to maintain the metadata containers 6, 8 and 10. For example, the metadata containers 6, 8 and 10 could be implemented as XML documents that can be searched using conventional XML query techniques. If desired, the XML documents could themselves be stored in an XML document database.

Turning now to FIGS. 5-9, one possible technique for presenting the metadata information maintained by the metadata management system 26 is shown. The illustrated metadata display technique, which utilizes a sequence of hierarchy and category displays generated via the user interface 28, should be considered as only one of many available approaches that could be used to display and navigate through metadata and source code. A multitude of other display formats, including maps, graphs, trees, listings, objects, models, etc., could also be used to help persons study the underlying source data.

Figure 5:
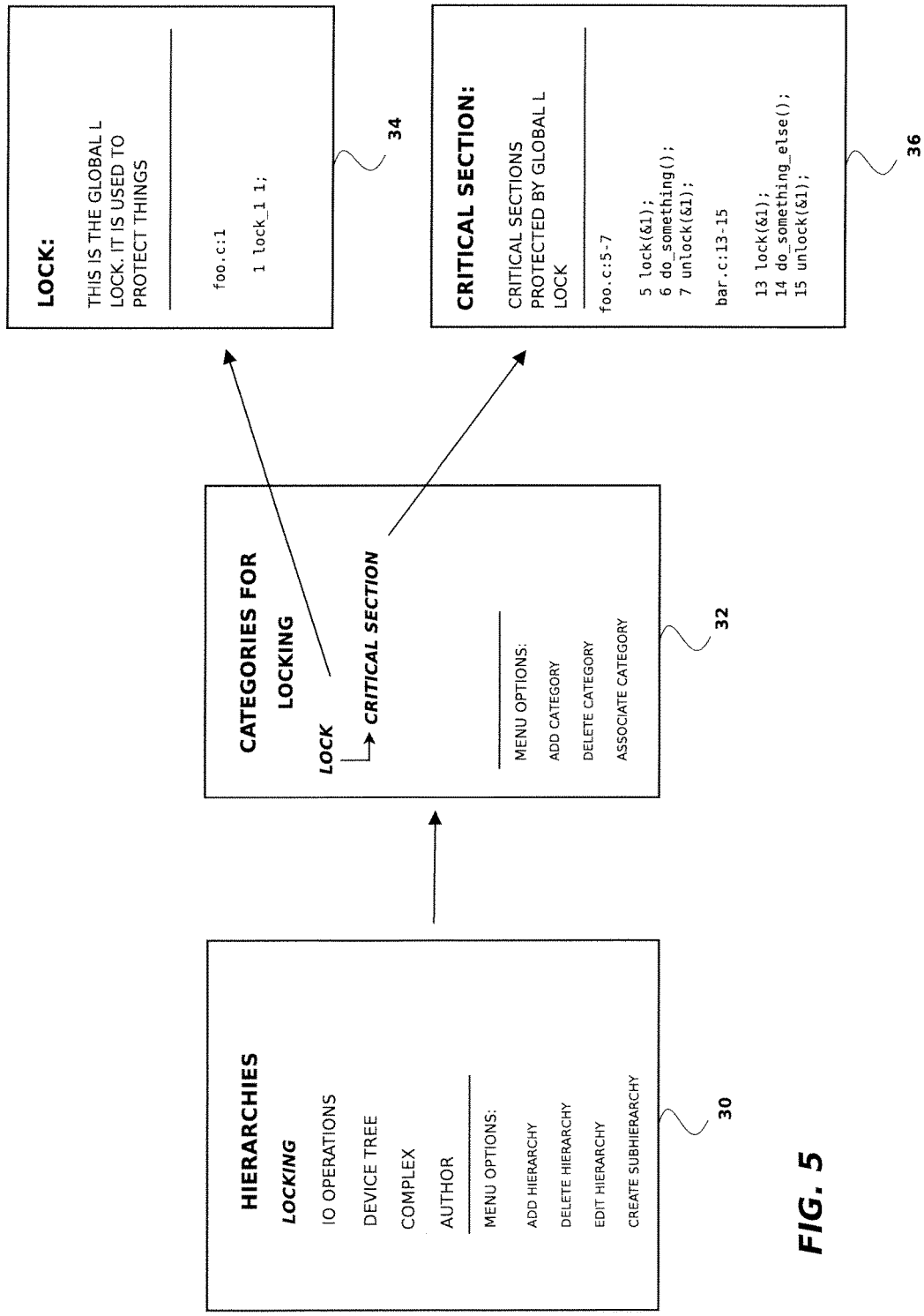
FIG. 5 is a diagrammatic representation of a set of exemplary graphical display windows showing a metadata hierarchy.

FIG. 5 shows a first exemplary sequence of metadata displays that may be output on the user interface 28 by the metadata management system 26 of FIG. 4. These displays may be generated for administrators in order to create new metadata containers, establish, modify and extend metadata hierarchies, and create associations between metadata hierarchies and metadata categories. The same displays may also be generated on behalf of searchers when the metadata management system 26 is used as a metadata search tool. In that case, however, administrative menu options shown on the displays can be grayed out or eliminated.

The left-hand display 30 of FIG. 5 is a hierarchy display showing an exemplary top level of a metadata hierarchy. To build this display, the metadata management system 26 of FIG. 4 may search the "Hierarchy" index of the database table 20 as well as the custom tag indices. The displayed metadata hierarchies are shown to include the top-level "Locking" hierarchy of the metadata containers 6, 8 and 10. By way of example only, the hierarchy display 30 also indicates that there are other metadata containers assigned to hierarchies named "IO Operations" and "Device Tree" in the database table 20. The top level "Complex" and "Author" custom domains are also shown.

The middle display 32 is a category display showing exemplary categories of the "Locking" hierarchy, namely, the "Lock" category and the "Critical Section" sub-category. To build this display, the metadata management system 26 of FIG. 4 may search the "Category" index of the database table 20 for all entries that are also assigned to the "Locking" hierarchy. Thus, the displayed metadata categories will include the "Lock" category of the metadata container 8 of FIG. 3 and the "Critical Section" sub-category of the metadata containers 8 and 10 of FIG. 3. As described above, the middle display 32 illustrates a precedence of the two categories based on the precedence indicators stored in the category fields of the metadata containers 8 and 10 of FIG. 3. Category precedence may be presented in any desired manner, and it should be understood that the arrow indication of the display 32 merely illustrates one possible technique.

Initially, only the hierarchy display 30 might be generated on the user interface 28. The category display 32 may then be generated in response to an interface action being performed in the hierarchy display 30, such as selecting the "Locking" hierarchy using a mouse or other input device (e.g., by moving the mouse over the hierarchy item or by left-clicking the item). As shown, a hierarchy editing menu may also be provided in the hierarchy display 30 for the benefit of administrators, providing such options as adding a new hierarchy, deleting a hierarchy, editing a hierarchy and extending a hierarchy to another level to create a sub-hierarchy. Each of these operations may be effected by the metadata management system 26 of FIG. 4 by manipulating the database table 20. For example, the "Add," "Delete" and "Edit Hierarchy" operations may be performed by manipulating the hierarchy field of existing metadata containers, or by adding or deleting metadata containers. The "Create Sub-Hierarchy" operation may be performed by appending a sub-hierarchy name to the hierarchy field of existing metadata containers, or by adding metadata containers with the hierarchy field identifying the hierarchy/sub-hierarchy information. For example, if a "Spinlocking" sub-hierarchy was to be added to the "Locking" hierarchy, the hierarchy field for affected metadata containers in the database table 20 could be changed to "Locking.Spinlocking." It will be appreciated that any number of sub-hierarchy levels may be created, depending on the source code being annotated. Similarly, if it is determined that a sub-hierarchy is no longer necessary, it could be removed.

The "Create Sub-Hierarchy" menu item of the hierarchy display 30 allowing a sub-hierarchy to be created could additionally be implemented by having a metadata administrator select an existing hierarchy item in a way that invokes the desired menu function (e.g., by right-clicking the item). Performing such an action on a hierarchy item could result in the metadata management system 26 generating a pop up display (not shown) with a "Create Sub-Hierarchy" option. This would allow the selected hierarchy to be extended to another level.

The category display 32 may also have its own editing menu, providing such options as "Add Category," "Delete Category" and "Associate Category." The last menu option allows an existing category to be re-associated with a different or additional hierarchy. Again, each of these operations may be effected by the metadata management system 26 of FIG. 4 manipulating the database table 20. For the "Add Category" and "Delete Category" selections, metadata containers could be created or removed, or the category field of existing metadata containers could be edited. For the "Associate Category" selection, the hierarchy or custom tag fields of the target category could be edited. The "Associate Category" menu item of the category display 32 allowing a category to be re-associated could additionally be implemented by having a metadata administrator select an existing category in a way that invokes the desired menu function, such as by right-clicking the item. Performing such an action on a category item could result in the metadata management system 26 generating a pop up display (not shown) with an "Associate Category" option. This would allow the selected category to be linked to a different hierarchy.

As previously stated, the displays 30 and 32 may also be used for metadata searching. Initially, only the hierarchy display 30 might be generated in the user interface 28. During a metadata search, if the searcher encounters the hierarchy display 30 and is interested in locks, he/she may select the "Locking" hierarchy. This would result in the metadata management system 26 of FIG. 4 generating the category display 32, whereupon the searcher could browse the "Lock" category and the "Critical Section" sub-category. Selection of the "Lock" category may result in the metadata contained in the FIG. 3 storage entity 12 associated with metadata container 6 being displayed, for example, in the upper right-hand display 34 of FIG. 5. Selection of the "Critical Section" sub-category may result in the metadata contained in the storage entity 14 associated with the metadata containers 8 and 10 of FIG. 3 being displayed, for example, in the lower right-hand display 36 of FIG. 5. As shown in the displays 34 and 36, it is usually helpful to show the metadata with the underlying code data. However, user interface options (not shown) may be provided for displaying only the metadata, only the code, or some combination thereof, such as only showing the code for one critical section at a time.

The metadata management system 26 of FIG. 4 may permit metadata searching at any level of the metadata hierarchy. For example, if the searcher is not ready to view the category display 32 of FIG. 5 and instead wants more general information about locking, the "Locking" hierarchy item in the hierarchy display 30 could be selected in a way (e.g., by double clicking a mouse input device) that generates generic metadata pertaining to locking. If desired, this generic locking metadata could be displayed with source code, such as all of the code relating to locking, including line 1 of the foo.c source code file 2, lines 5-7 of foo.c, and lines 13-15 of the bar.c source code file 4. In order to accomplish the foregoing, a separate metadata container containing the generic locking metadata may be created. This generic metadata container could be distinguished from the metadata containers 6, 8 and 10 in any suitable fashion, such as by not including category information. Thus, whereas the hierarchy field of the generic metadata container may specify "Locking," the absence of a value in the category field could be interpreted by the metadata management system 26 as an indication that this metadata container should not be shown in the category display 32.

Figure 6:
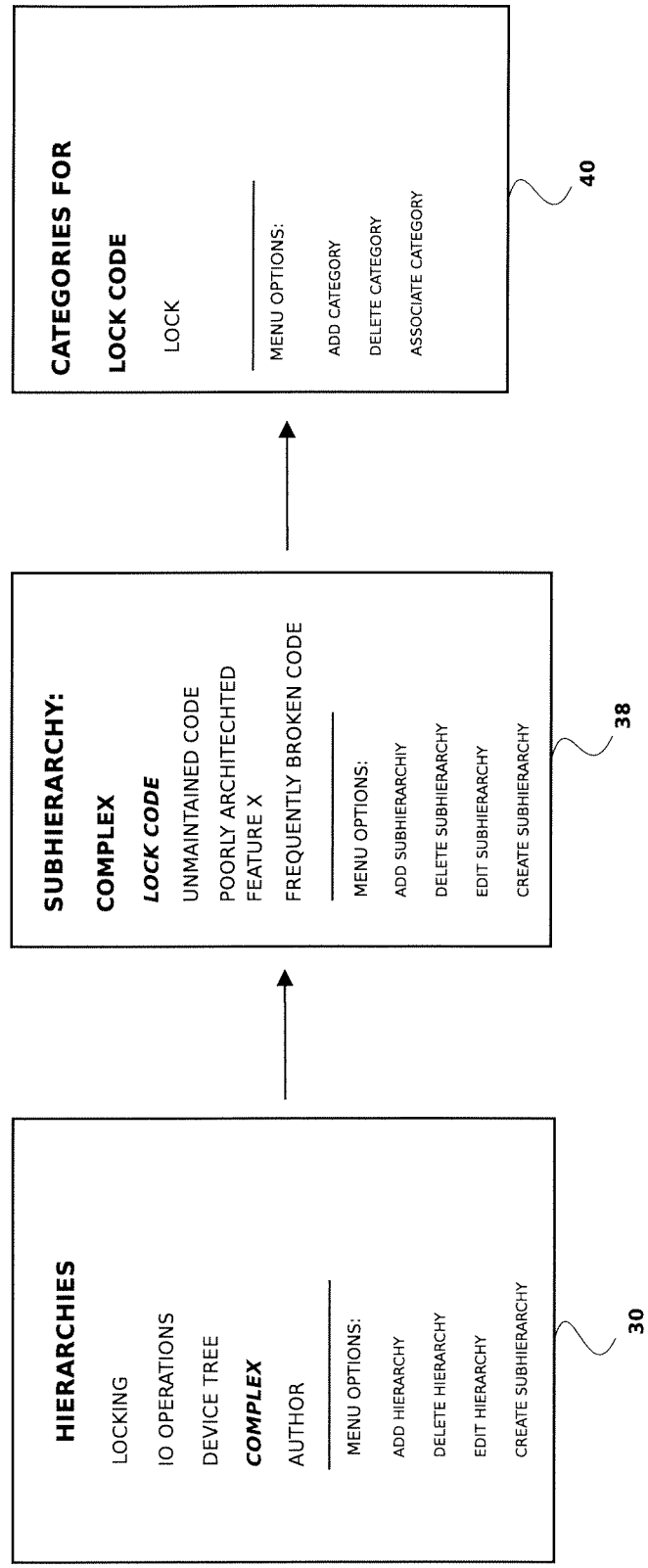
FIG. 6 is a diagrammatic representation of a set of exemplary graphical display windows showing another metadata hierarchy.

FIG. 6 shows another exemplary sequence of metadata displays that may be output on the user interface 26 of FIG. 4. The left-hand display is the hierarchy display 30 of FIG. 5, except that the hierarchy item labeled "Complex" has been selected. The middle display 38 is a sub-hierarchy display showing the "Lock Code" sub-hierarchy of the "Complex" hierarchy. Additional exemplary sub-hierarchies of the "Complex" hierarchy are also illustrated, namely, an "Unmaintained Code" sub-hierarchy, a "Poorly Architected Feature X" sub-hierarchy, and a "Frequently Broken Code" sub-hierarchy. The sub-hierarchy display 38 may include a sub-hierarchy editing menu that provides the same options as the hierarchy display 30. The "Lock Code" sub-hierarchy is shown as being selected. This results in a right-hand category display 40 being generated. The category display 40 shows the "Lock" category specified in the metadata container 6 of FIG. 3, as this is the only metadata container at the "Complex"."Lock Code" hierarchy level. As in the case of the display 32 of FIG. 5, selection of the "Lock" category in the display 40 of FIG. 6 may result in the display 34 of FIG. 5 being generated. The category display 40 may have the same menu options as the category display 32 of FIG. 5.

Figure 7:
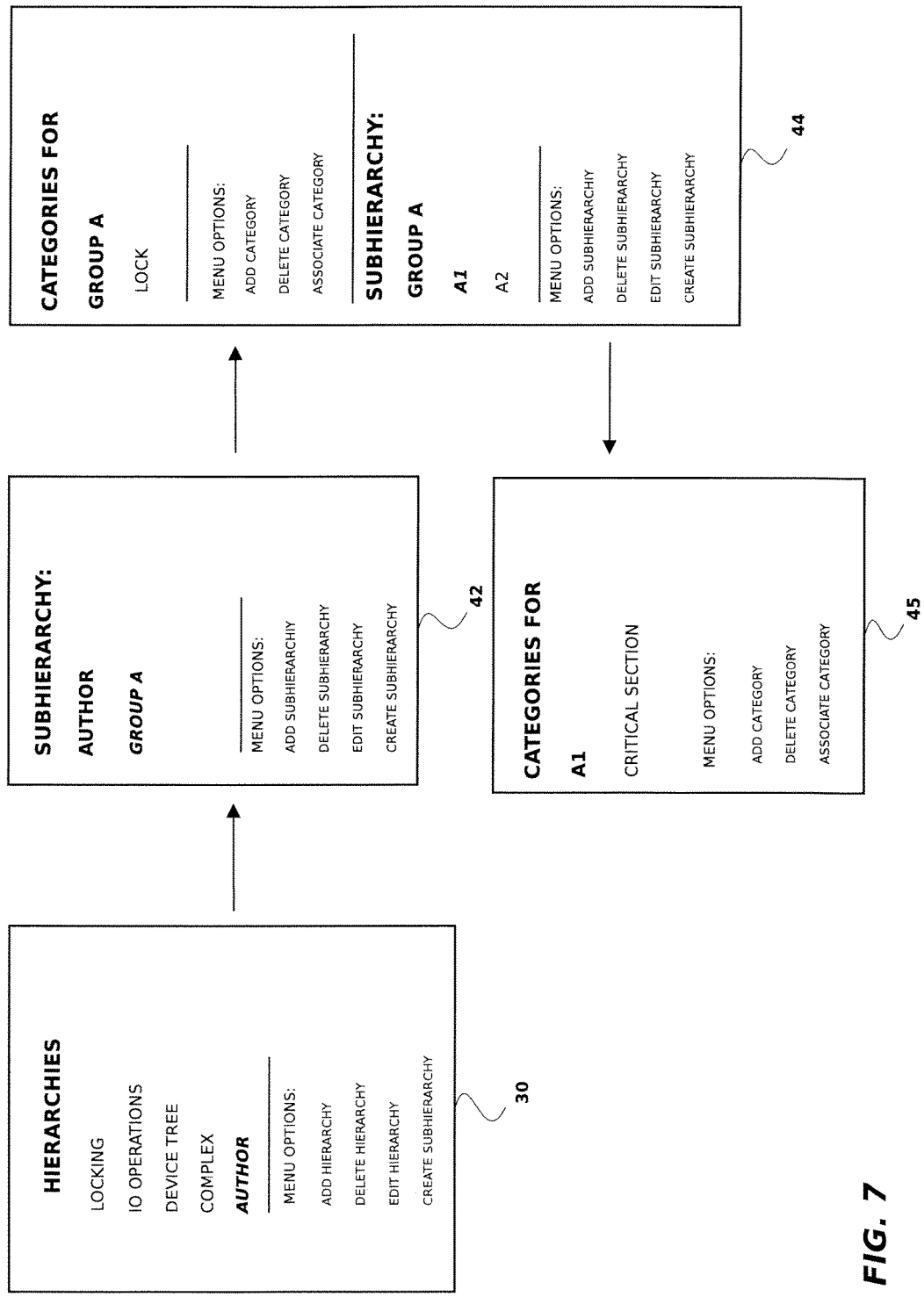
FIG. 7 is a diagrammatic representation of a set of exemplary graphical display windows showing another metadata hierarchy.

FIG. 7 shows a further exemplary sequence of metadata displays that may be output on the user interface 26 of FIG. 4. The left-hand display is the hierarchy display 30 of FIG. 5, except that the hierarchy item labeled "Author" has been selected. The upper middle display 42 is a sub-hierarchy display showing the "Group A" sub-hierarchy of the "Author" hierarchy. The upper right-hand display 44 is a combination category and sub-hierarchy display resulting from the selection of "Group A" in the display 42. The category portion of the display 44 lists the "Lock" category of the metadata container 6 of FIG. 3. As in the case of the display 32 of FIG. 5, selection of the "Lock" category in the display 44 of FIG. 7 may result in the display 34 of FIG. 5 being generated. The sub-hierarchy portion of the display 44 lists the "A1" and "A2" sub-hierarchies listed in the second custom tag fields of the metadata containers 6 and 8 of FIG. 3. A category display 45 lists the "Critical Section" category of the metadata container 8 as being within the "A1" group sub-hierarchy, as specified in the custom tag fields of this container. As in the case of the display 32 of FIG. 5, selection of the "Critical Section" category in the display 40 of FIG. 6 may result in the display 36 of FIG. 5 being generated.

Figure 8:
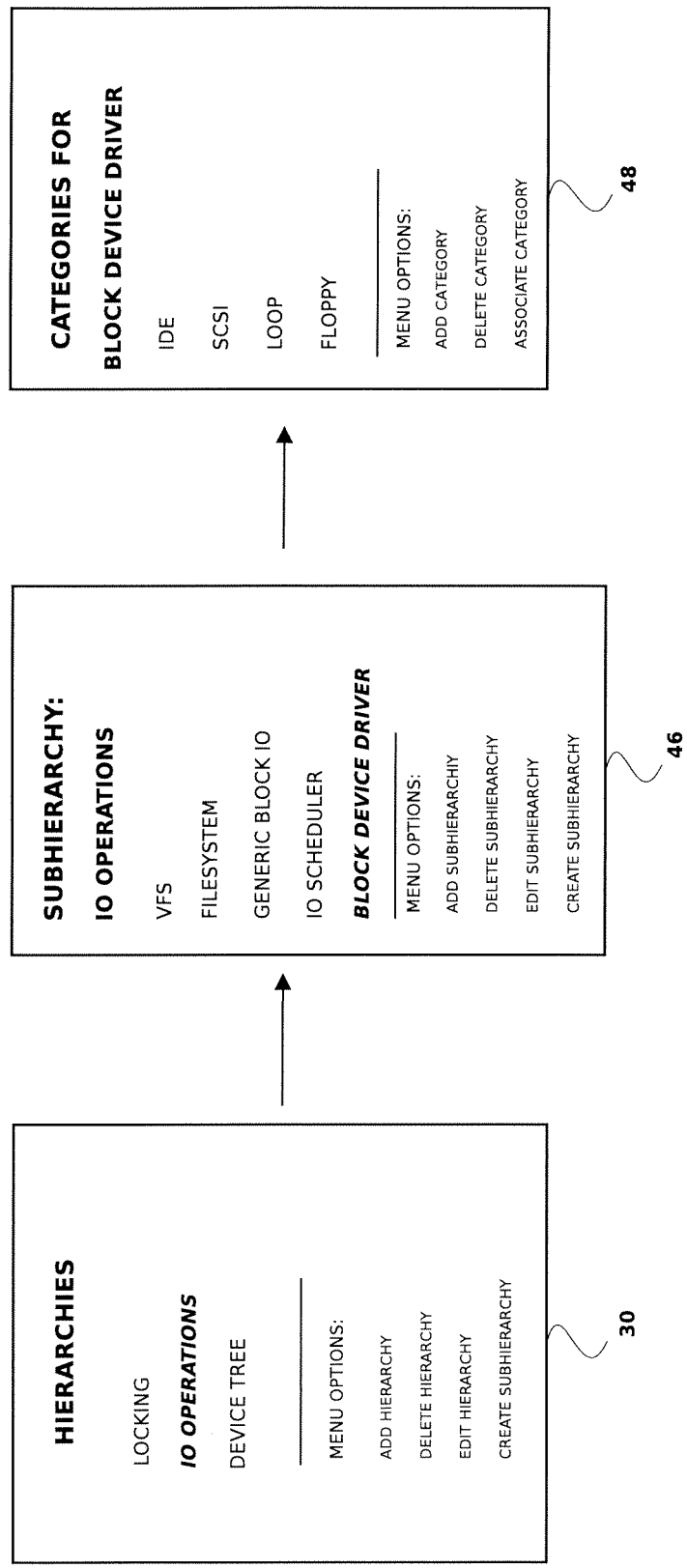
FIG. 8 is a diagrammatic representation of a set of exemplary graphical display windows showing another metadata hierarchy.

FIG. 8 shows a still further exemplary sequence of metadata displays that may be output on the user interface 26 of FIG. 4. The left-hand display is the hierarchy display 30 of FIG. 5, except that the hierarchy labeled "IO Operations" has been selected. The middle display 46 is a sub-hierarchy display showing various sub-hierarchies of the "IO Operations" hierarchy. The sub-hierarchy labeled "Block Device Driver" is shown as being selected and this results in a category display 48 being generated. The category display 48 shows exemplary categories of the "Block Device Driver" sub-hierarchy.

Figure 9:
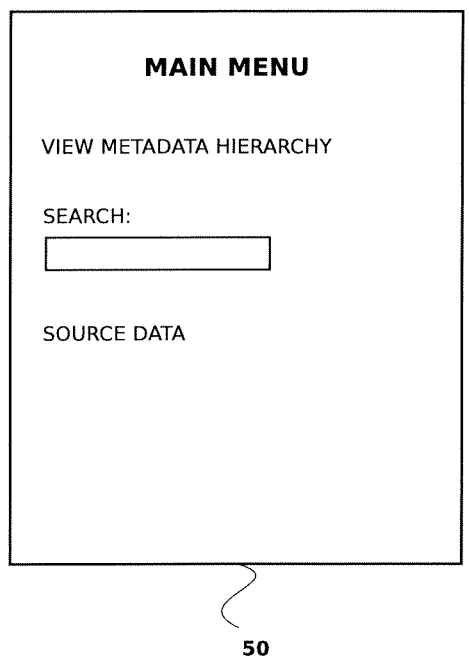
FIG. 9 is a diagrammatic representation of an exemplary main menu display for accessing metadata and an annotated file.

FIG. 9 shows that the metadata management system 26 of FIG. 4 may also generate a main menu display 50 that is could be used as a start-up screen. Exemplary selection options that may be provided in the main menu display 50 might include a "View Metadata Hierarchy" selection that would lead to the hierarchy display 30 of FIGS. 5-8. Another exemplary selection option might include a "Search" selection that allows metadata and/or source code search terms to be specified. In response to a search request, the metadata management system 26 of FIG. 4 may be adapted to search metadata containers (such as the metadata containers 6, 8 and 10 of FIG. 3) and their metadata storage entities (such as the storage entities 12 and 14 of FIG. 3), the source code, or both. A further exemplary selection option might include a "Source Data" selection that allows direct source data access, such as by displaying a source data directory tree for navigation. As discussed by way of introduction above, links in the source data could be provided to allow a searcher to call up the metadata for a particular piece of source data when desired. Preferably, once a given metadata item is displayed, the display methodology will permit the user to traverse the metadata hierarchy using appropriate user interface options. For example, each of the displays in FIGS. 5-8 preferably allows a person to navigate bidirectionally through the metadata hierarchies and categories.

Figure 10:
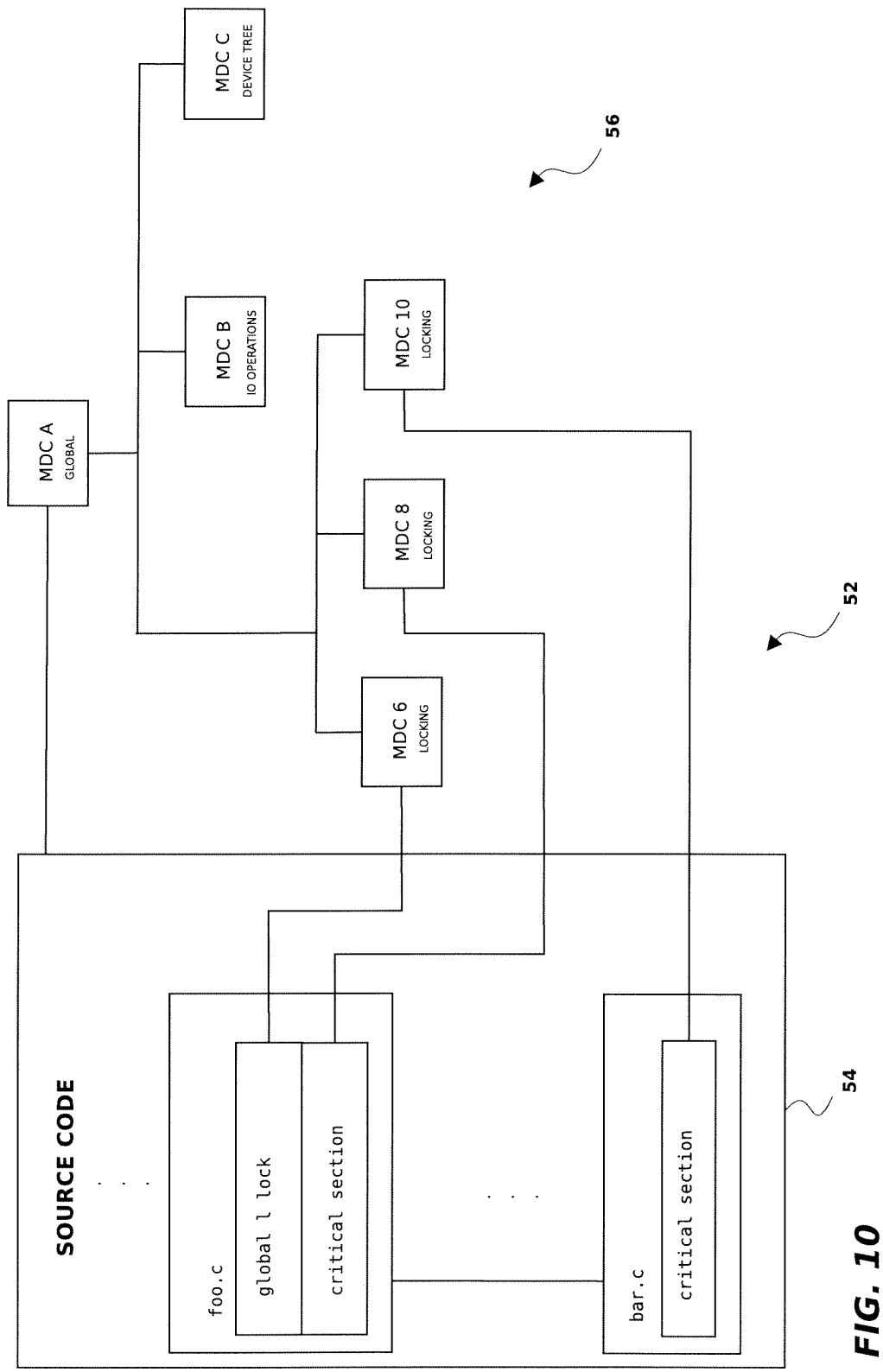
FIG. 10 is a block diagram showing an exemplary metadata/source code infrastructure.

Turning now to FIG. 10, a representative metadata/source code infrastructure 52 is shown that illustrates some of the exemplary associations among metadata containers and source code that have been described above. On the left-hand side of FIG. 10 is a body of source code 54. On the right-hand side of FIG. 10 is a set of exemplary metadata containers (MDC) 56 that represent the metadata annotation information for the source code 54. These include the metadata containers 6, 8 and 10 (MDC 6, MDC 8 and MDC 10). Each of the metadata containers 56 is shown to be associated with some portion of the source code 54, thereby establishing a set of exemplary data/metadata relationships. The metadata containers 56 are also associated with each other to establish a set of exemplary metadata/metadata relationships. The root node could be a global metadata container (MDC A) that is associated with the entire body of source code 54 and which provides top level information about the product. The second tier of nodes includes metadata containers (MDC B and MDC C) that respectively contain information about "IO Operations" and "Device Tree." The second tier of nodes also contains the metadata containers 6, 8 and 10 (MDC 6, MDC 8 and MDC 10) of FIG. 3. MDC 6 is shown to be associated with the global 1 lock variable declaration in the foo.c source code file 2. Similarly, MDC 8 is associated with the critical section of foo.c and MDC 10 is associated with the critical section of the bar.c source code file 4.

It will be appreciated that any number of additional data/metadata and metadata/metadata relationships may be established in the metadata/source code infrastructure 54. In this way, searchers may follow many different pathways through the metadata (and source data) space, allowing them to traverse the information at a desired level of detail while affording the opportunity to pull back to a higher level scope or drill down through the metadata layers to a lower level scope containing greater detail.

Figure 11:
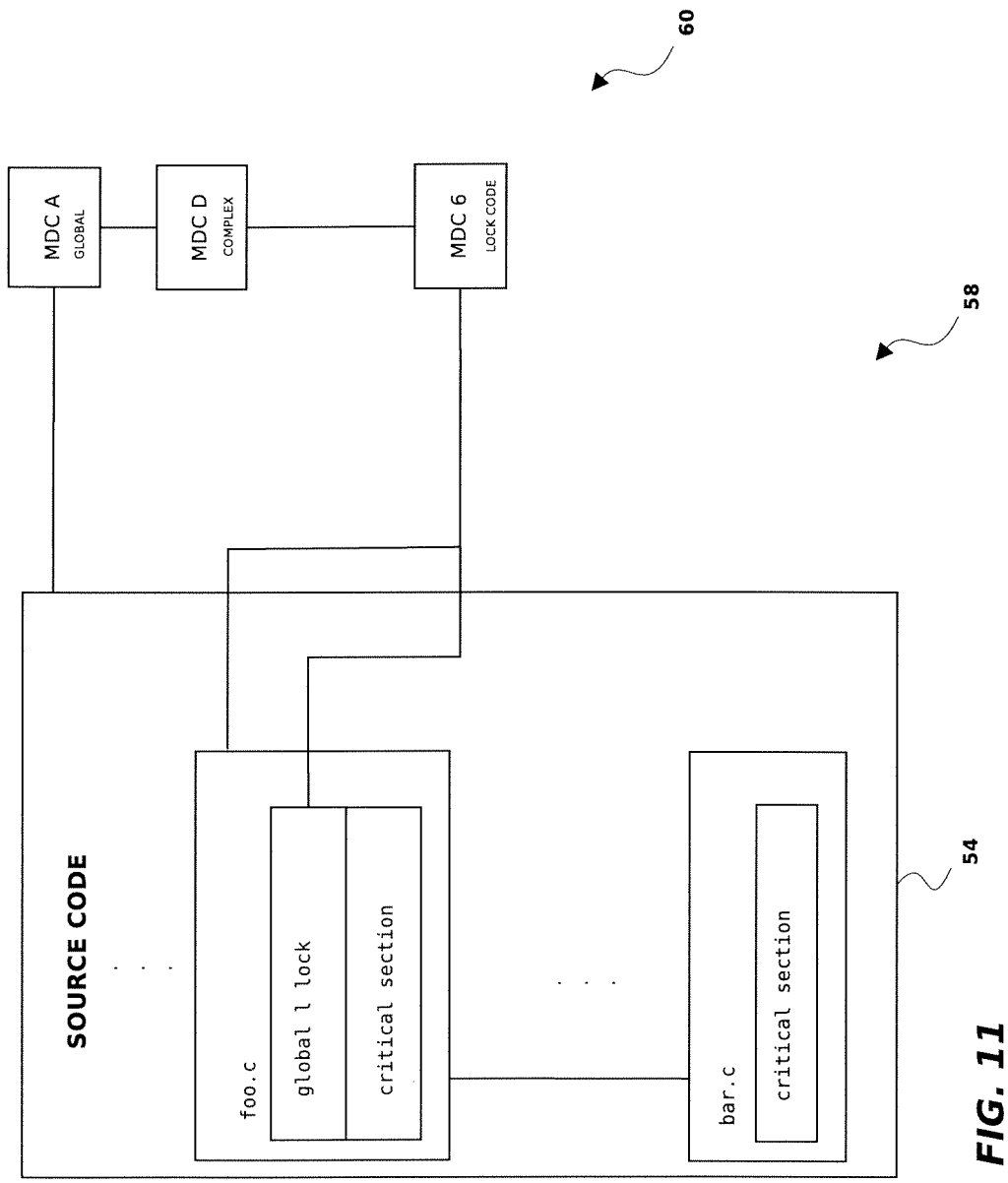
FIG. 11 is a block diagram showing another exemplary metadata/source code infrastructure.

For example, whereas FIG. 10 illustrates the "Locking" hierarchy of the metadata containers 6, 8, and 10, FIG. 11 illustrates another representative metadata/source code infrastructure 58 comprising the source code 54 and a set of metadata containers 60 representing the custom "Complex" domain hierarchy. The first tier of this hierarchy is the global metadata container (MDC A). The second tier of the illustrated hierarchy is a metadata container (MDC D) representing all "Complex" code. The third tier of the hierarchy contains the metadata container 6 (MDC). The metadata containers 8 and 10 are not represented because they are not associated with complex code. FIG. 11 also shows the metadata 6 (MDC 6) being associated with two different contexts representing nested ranges of source code data, namely, the global 1 lock context shown in FIG. 3 and also the entire foo.c source code file context. Again, these data/metadata relationships may be statically defined or dynamically defined using one or more regular expressions.

Figure 12:
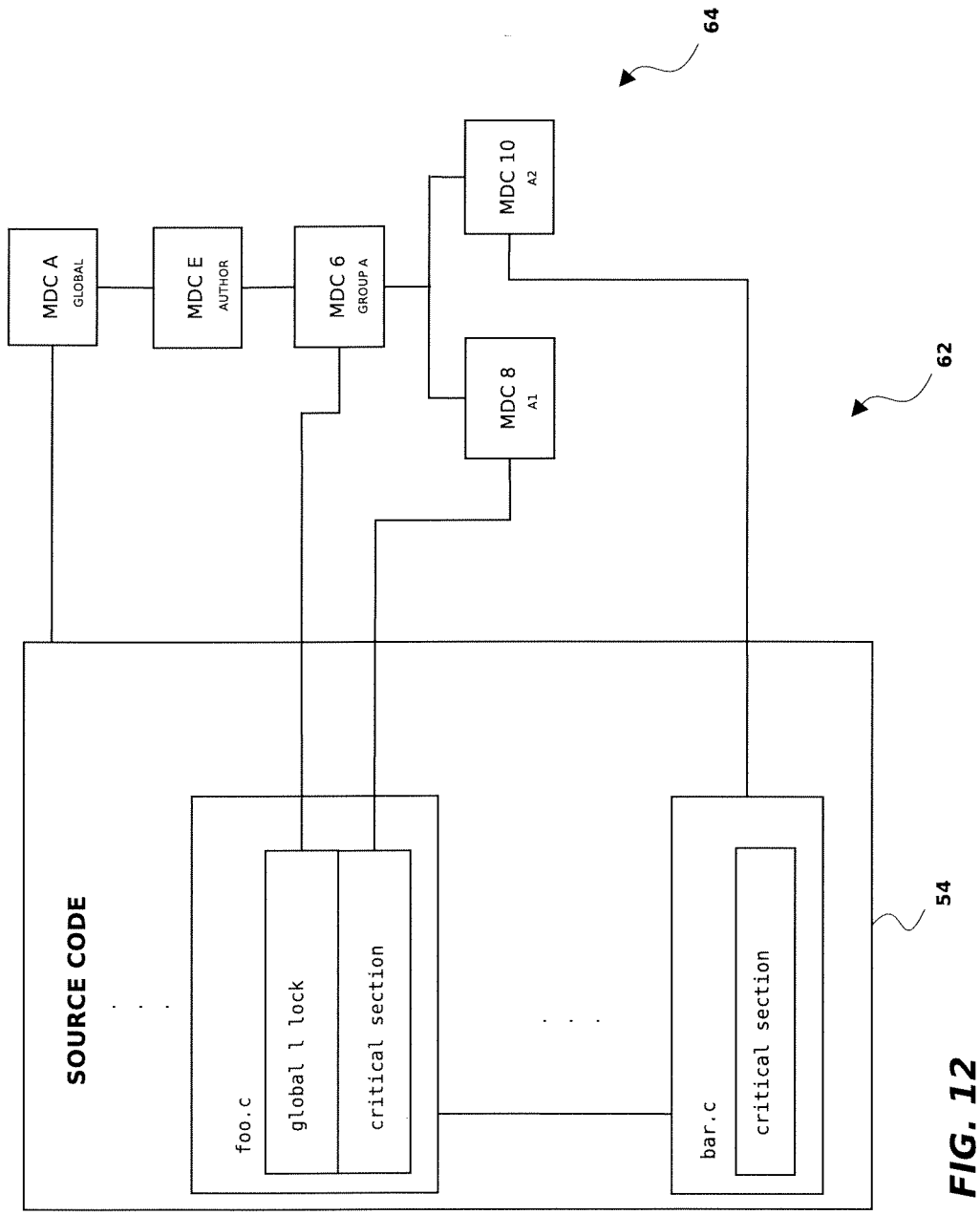
FIG. 12 is a block diagram showing another exemplary metadata/source code infrastructure.

FIG. 12 illustrates another representative metadata/source code infrastructure 62 comprising the source code 54 and a set of metadata containers 64 representing the custom "Author" domain hierarchy. The first tier of this hierarchy is the global metadata container (MDC A). The second tier of the illustrated hierarchy is a metadata container (MDC E) representing the "Author" domain. The third tier of the hierarchy contains the metadata container 6 (MDC), which is associated with the "Author" sub-hierarchy "Group A." The fourth tier of the hierarchy contains the metadata containers 8 and 10 (MDC 8 and MDC 10), which contain the metadata associated with the "Group A" sub-hierarchies "A1" and "A2."

Figure 13:
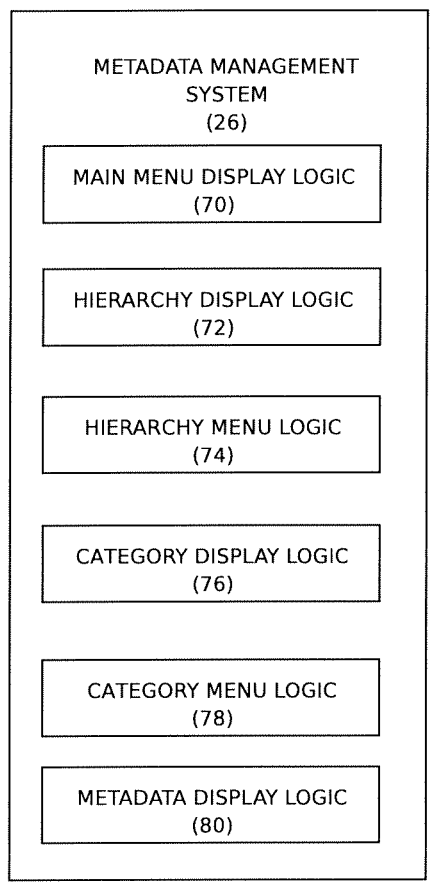
FIG. 13 is block diagram showing exemplary components of a metadata management system.

Turning now to FIG. 13, the metadata management system 26 is shown to include several exemplary logic components associated with the metadata management operations described above. These components include main menu display logic 70, hierarchy display logic 72, hierarchy menu logic 74, category display logic 76, category menu logic 78 and metadata display logic 80.

Figure 14:
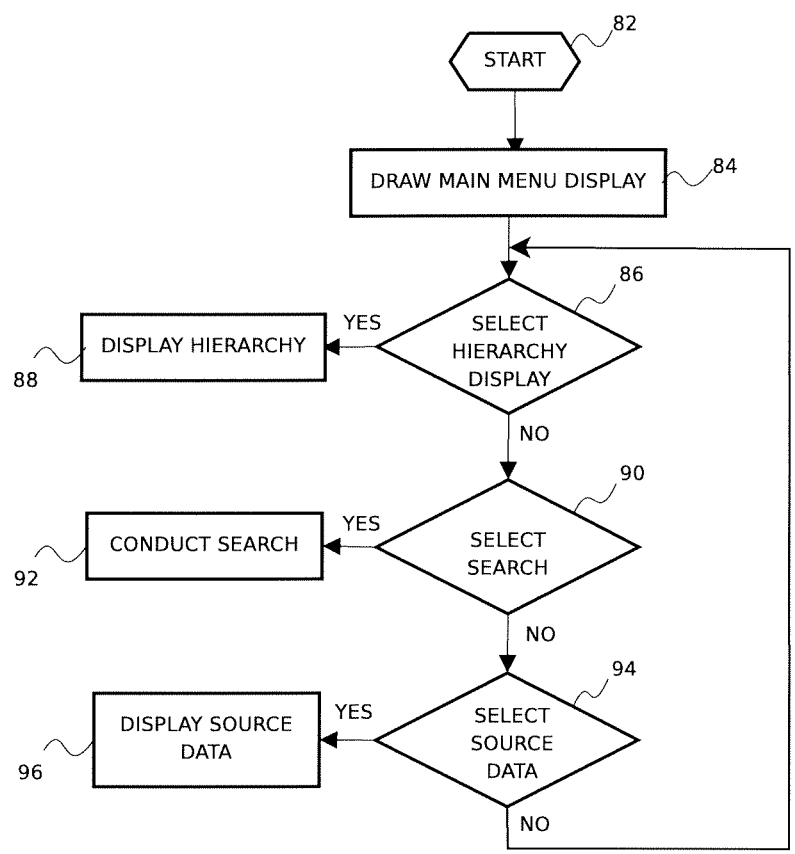
FIG. 14 is a flow diagram showing exemplary main menu display logic.

With additional reference now to FIG. 14, processing by the main menu display logic 70 begins at block 82. In block 84, the main menu 50 of FIG. 9 is generated and the main menu display logic waits for input. If a user requests to view the metadata hierarchy in block 86, the hierarchy display 30 of FIGS. 5-8 is generated in block 88. This operation may be performed by searching the hierarchy and custom tag indices of the database table 20 of FIG. 4 and selecting the top-level values for display. If a user requests a search in block 90, a search is conducted in block 92. This operation may be performed by searching relevant indices of the database table 20 (depending on the search expression), identifying metadata containers matching the search expression, and generating search results using a suitable display format (not shown). If a user requests to view source data in block 94, all or a portion (e.g., a listing of files) of the source data is displayed in block 96 using a suitable display format (not shown). The source data may be displayed with user-selectable indicia (e.g., hyperlinks) that allow corresponding metadata to be displayed.

Figure 15:
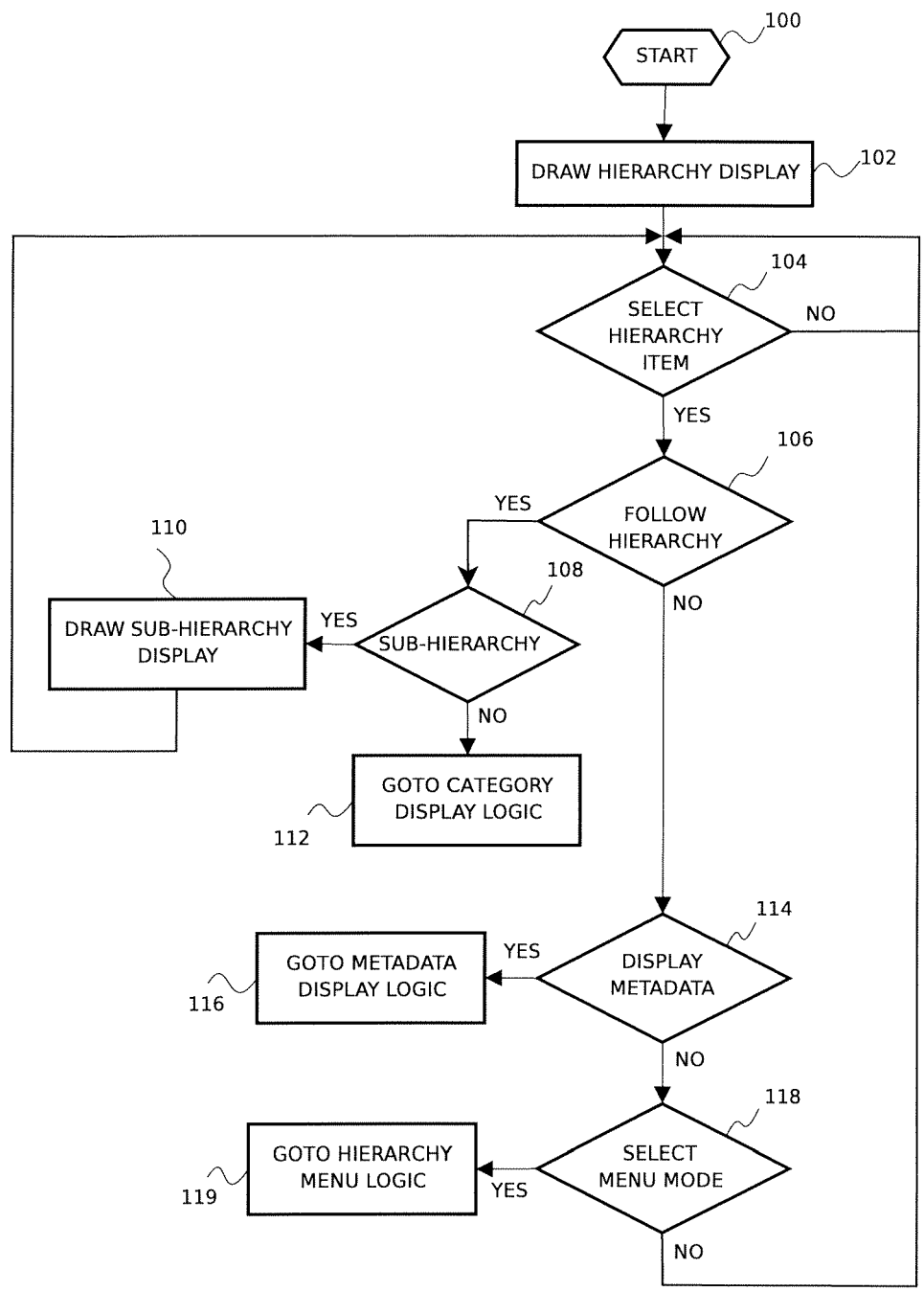
FIG. 15 is a flow diagram showing exemplary hierarchy display logic.

With additional reference now to FIG. 15, processing by the hierarchy display logic 72 of FIG. 13 begins at block 100. In block 102, the hierarchy display 30 of FIGS. 5-8 is generated and the hierarchy display logic 72 waits for input. If a user selects a hierarchy item in block 104, the hierarchy display logic 72 must determine from the type of input (e.g., left mouse click, right mouse click, double mouse click) what it is that the user wishes to view. As described above, options may include the user following the hierarchy to the next level (e.g., by left-clicking a mouse input device), entering the menu options mode (e.g. by right-clicking a mouse input device) and viewing summary metadata information (if any) regarding a hierarchy item (e.g. by double-clicking a mouse input device). In block 106, if it is determined from the input that the user wishes to follow the hierarchy, the hierarchy display logic 72 determines in block 108 whether the next display to be generated should be a sub-hierarchy display, a category display, or both (e.g., see the display 44 of FIG. 7). This operation may be performed by searching for the selected hierarchy item in the database table 20 of FIG. 4. If one or more sub-hierarchy items exist, a sub-hierarchy display is drawn in block 110 and processing returns to block 104. If no sub-hierarchy item exists, or if a sub-hierarchy display has already been drawn in block 110 and there are also one or more category items, the category display logic 76 of FIG. 13 is invoked. In block 114, if it is determined from the input that the user wishes to display summary metadata, the metadata display logic 80 of FIG. 13 is invoked in block 116. In block 118, if it is determined from the input that the user wishes to enter the menu options mode, the hierarchy menu logic 74 of FIG. 13 is invoked in block 119.

Figure 16:
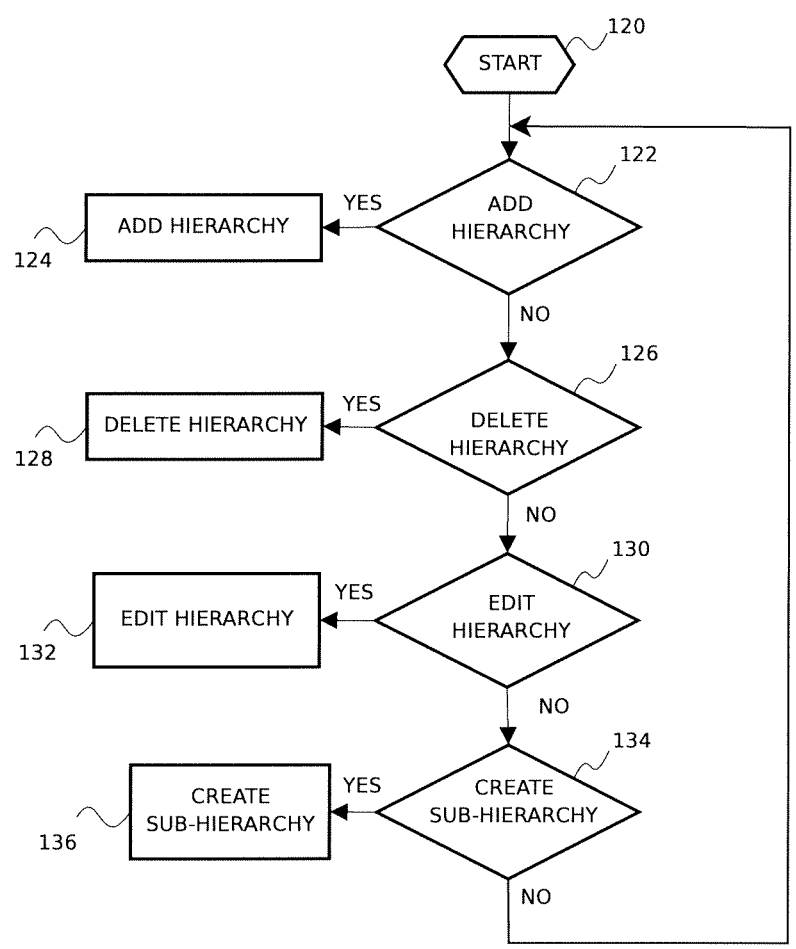
FIG. 16 is a flow diagram showing exemplary hierarchy menu logic.

With additional reference now to FIG. 16, processing by the hierarchy menu logic 74 of FIG. 13 begins at block 120. If a user requests to add a hierarchy in block 122, an add hierarchy operation is performed in block 124. This operation may be performed by prompting the user for information about the new hierarchy, then editing one of the hierarchy or custom tag indices of the database table 20 of FIG. 4. A new metadata container may or may not be created when a new hierarchy is added. If a user requests to delete a hierarchy in block 126, a delete hierarchy operation is performed in block 128. This operation may be performed by prompting the user for information about the hierarchy to be deleted, then editing one of the hierarchy or custom tag indices of the database table 20 of FIG. 4. A metadata container may or may not be deleted when a hierarchy is deleted. If a user requests to edit a hierarchy in block 130, an edit hierarchy operation is performed in block 132. This operation may be performed by prompting the user for information about the hierarchy to be edited, then editing one of the hierarchy or custom tag indices of the database table 20 of FIG. 4. If a user requests to create a new sub-hierarchy in block 134, a create sub-hierarchy operation is performed in block 136. This operation may be performed by prompting the user for information about the sub-hierarchy to be created, then editing one of the hierarchy or custom tag indices of the database table 20 of FIG. 4. A metadata container may or may not be created when a new sub-hierarchy is created.

Figure 17:
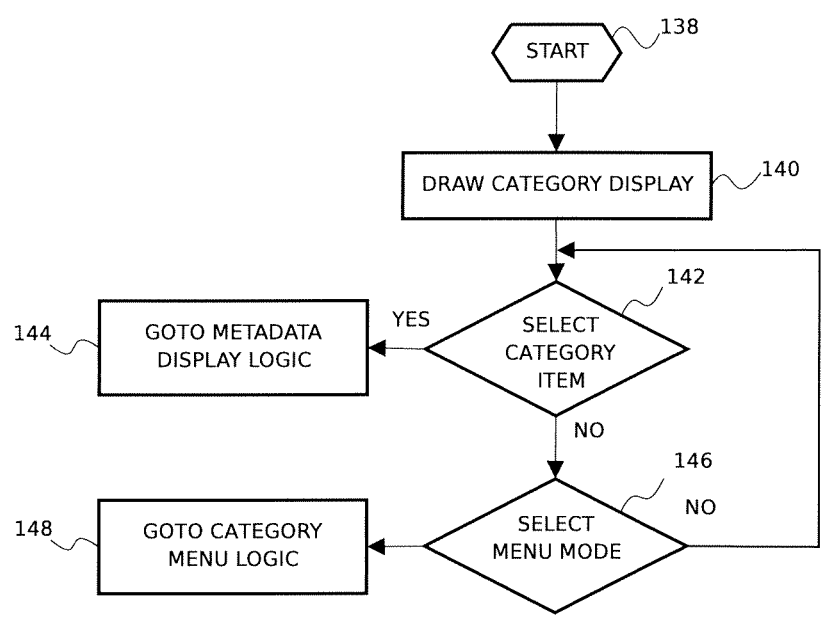
FIG. 17 is a flow diagram showing exemplary category display logic.

With additional reference now to FIG. 17, processing by the category display logic 76 of FIG. 13 begins at block 138. In block 140, a category display such as one of the displays 32, 40, 45 and 48 of FIGS. 5-8 is generated and the category display logic 76 waits for input. The category display logic 76 must determine from the type of input (e.g., left mouse click, right mouse click) what it is that the user wishes to view. As described above, options may include the user selecting the category in order to display metadata and/or source data (e.g., by left-clicking a mouse input device) or entering the menu options mode (e.g. by right-clicking a mouse input device). In block 142, if it is determined from the input that the user has selected a category for viewing, the metadata display logic 80 of FIG. 13 is invoked in block 144. In block 146, if it is determined from the input that the user wishes to enter the menu options mode, the category menu logic 78 of FIG. 13 is invoked in block 148.

Figure 18:
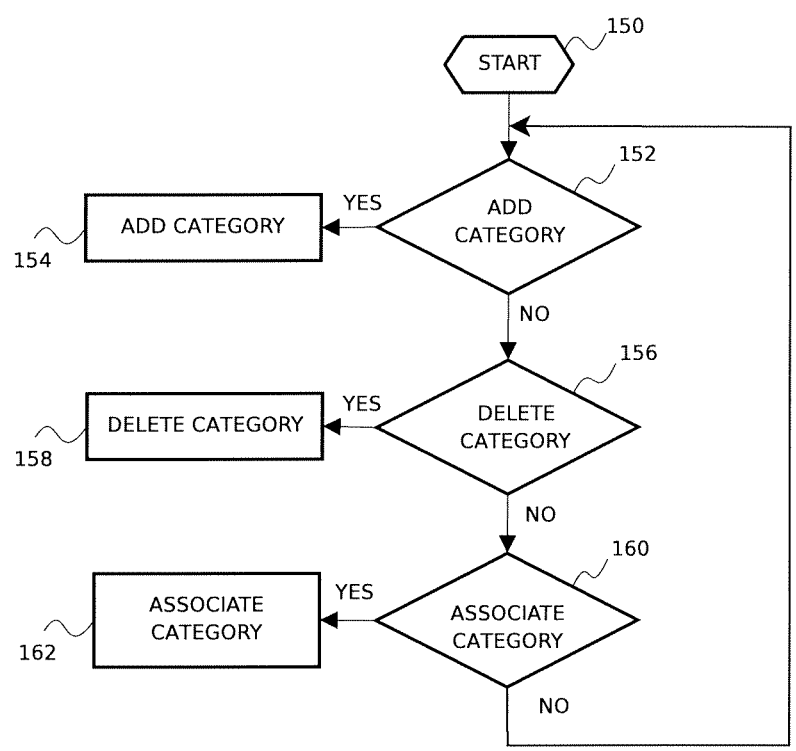
FIG. 18 is a flow diagram showing exemplary category menu logic.

With additional reference now to FIG. 18, processing by the category menu logic 78 of FIG. 13 begins at block 150. If a user requests to add a category in block 152, an add category operation is performed in block 154. This operation may be performed by prompting the user for information about the new category, then editing the category index of the database table 20 of FIG. 4. A new metadata container may or may not be created when a new category is added. If a user requests to delete a category in block 156, a delete category operation is performed in block 158. This operation may be performed by prompting the user for information about the category to be deleted, then editing the category index of the database table 20 of FIG. 4. A metadata container may or may not be deleted when a category is deleted. If a user requests to associate a category with a different or additional hierarchy in block 160, an associate category operation is performed in block 162. This operation may be performed by prompting the user for information about the category to be reassociated, identifying entries corresponding to the selected category, then editing one or more of the hierarchy or custom tag indices of the database table 20 of FIG. 4 to change the category's association. One or more metadata containers may be reassociated depending on how many belong to the target category.

Figure 19:
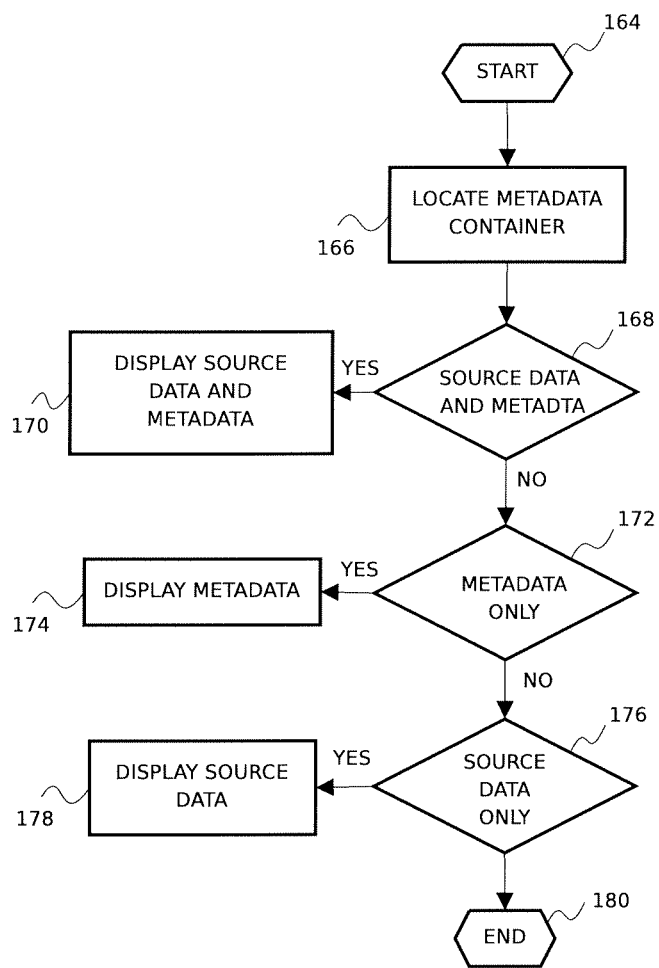
FIG. 19 is a flow diagram showing exemplary metadata display logic.

With additional reference now to FIG. 19, processing by the metadata display logic 80 of FIG. 13 begins at block 124. In block 166, the database table 20 of FIG. 4 is searched to locate all metadata containers belonging to a selected category. A viewing mode may be present (e.g., based on user input or a global setting) that dictates whether the metadata display logic 80 should display both metadata and source data, metadata only, or source data only. If metadata and source data are to be viewed in block 168, the metadata and source data information are retrieved from the identified metadata container(s) and displayed in block 170. If only metadata is to be viewed in block 172 the metadata information is retrieved from the identified metadata container(s) and displayed in block 170. If only source data is to be viewed in block 176 the source information is displayed in block 178. Block 180 terminates the metadata display processing. Note that blocks 170 and 178 include processing the context discriminants of the metadata containers located in block 166 in order to identify the associated source data. If the data/metadata relationships are statically defined, the source data can be identified by reading the context discriminants. If the data/metadata relationships are dynamically defined, the source data can be identified by parsing the regular expression that defines the dynamic relationship and identifying matching source data elements.

Figure 20:
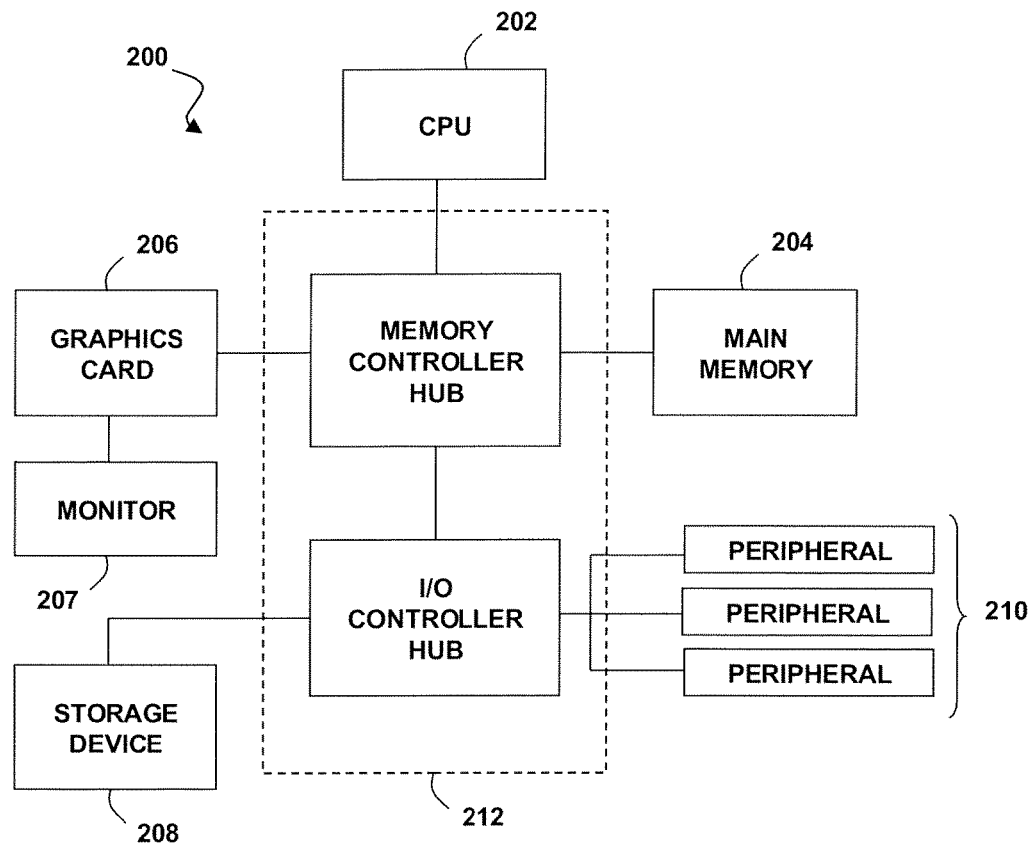
FIG. 20 is a functional block diagram showing exemplary data processing hardware that may be used to implement annotated file display.

Accordingly, a technique has been disclosed for managing source annotation metadata. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method, FIG. 20 illustrates an exemplary hardware environment 200 that may be used to provide a software implementation of the metadata management system 26, and optionally one or more of the other components of FIG. 4, including the database table 20, the database management system 22, the storage system 24 and the user interface 28. The hardware environment 200 includes one or more CPUs or other data processing resources 202 (data processor) and a main memory 204 that provide a data processing core, a graphics card 206 for generating visual output information to a display monitor 207, a peripheral storage device 208, other peripheral devices 210, and a bus infrastructure 212 interconnecting the foregoing elements. The software components of the metadata management system 26 may be loaded in the main memory 204. Various I/O (Input/Output) resources may be provided by the peripheral devices 210, which may include a USB bus controller, a SCSI disk controller, and a NIC. The monitor 207 may be implemented as part of the user interface 28 of FIG. 4.

Figure 21:
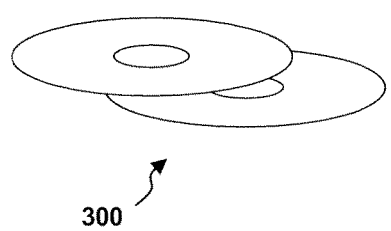
FIG. 21 is a diagrammatic representation of exemplary storage media that may be used in a computer program product providing software and/or firmware logic for implementing annotated file display.

Relative to a computer program product having a machine-readable media and programming logic, exemplary data storage media for storing the programming logic are shown by reference numeral 300 in FIG. 21. The media 300 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the metadata management system 26, and optionally one or more of the other components of FIG. 4, including the database table 20, the database management system 22, the storage system 24 and the user interface 28, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for managing source annotation metadata, said method being implemented by a machine operatively coupled to a storage device, said method comprising:

maintaining a set of metadata in said storage device, said metadata comprising source data annotation information regarding source data;

maintaining data/metadata relationships, each data/metadata relationship comprising an association between an individual unit of said metadata and an individual unit of said source data;

maintaining metadata/metadata relationships, each metadata/metadata relationship comprising an association between an individual unit of said metadata and another individual unit of said metadata;

said metadata/metadata relationships defining two or more intersecting hierarchical search pathways through said metadata that each represent a respective search domain, each hierarchical search pathway starting at a top-level metadata unit associated with that search pathway, extending through a unique set of zero or more intermediate metadata units, and ending at a lower-level metadata unit representing an intersection of said hierarchical search pathways and common to each of said search domains, such that said common metadata unit can be accessed via said two or more hierarchical search pathways by searching any of said search domains starting at their respective top-level metadata units; and each of said metadata units in said hierarchical search pathways being maintained by associated metadata containers having fields that define a data/metadata relationship between said metadata unit and a unit of said source data, and a metadata/metadata relationship between said metadata unit and another of said metadata units.

2. A method in accordance with claim 1, wherein said data/metadata relationships are arbitrarily defined and include one or both of statically defined data/metadata relationships and dynamically defined data/metadata relationships based on regular expressions.

3. A method in accordance with claim 1, wherein said metadata/metadata relationships are arbitrarily defined.

4. A method in accordance with claim 1, wherein each of said metadata containers comprises:

a context tag that defines one of said data/metadata relationships;

a hierarchy tag that defines one of said metadata/metadata relationships;

a category tag that represents an extension of said hierarchy tag and defines a category to which said metadata unit belongs;

a custom tag that defines an additional metadata/metadata relationship; and data identifying said metadata unit.

5. A method in accordance with claim 4, wherein said metadata containers are organized for searching said context tags, said hierarchy tags, said category tags and said custom tags.

6. A method in accordance with claim 4, wherein said metadata containers are organized in a database that maintains key indices on said context tags, said hierarchy tags, said category tags and said custom tags.

7. A method in accordance with claim 5, further including providing a metadata navigation interface by displaying said hierarchy tags and said custom tags for plural metadata containers as selectable items that can be selected to display said category tags, and wherein said category tags can be selected to display said metadata units, said source data or both.

8. A data processing system for managing source annotation metadata, comprising:

a data processor;

a source data store storing source data;

a metadata store storing a set of metadata comprising source data annotation information regarding said source data;

data/metadata relationship tags in said metadata store defining data/metadata relationships, each data/metadata relationship comprising an association between an individual unit of said metadata and an individual unit of said source data;

metadata/metadata relationship tags in said metadata store defining metadata/metadata relationships, each metadata/metadata relationship comprising an association between an individual unit of said metadata and another individual unit of said metadata;

said metadata/metadata relationships defining two or more intersecting hierarchical search pathways through said metadata that each represent a respective search domain, each hierarchical search pathway starting at a top-level metadata unit associated with that search pathway, extending through a unique set of zero or more intermediate metadata units, and ending at a lower-level metadata unit representing an intersection of said hierarchical search pathways and common to each of said search domains, such that said common metadata unit can be accessed via said two or more hierarchical search pathways by searching any of said search domains starting at their respective top-level metadata units; and each of said metadata units in said hierarchical search pathways being maintained by associated metadata containers having fields that define a data/metadata relationship between said metadata unit and a unit of said source data, and a metadata/metadata relationship between said metadata unit and another of said metadata units.

9. A system in accordance with claim 8, wherein said data/metadata relationships are arbitrarily defined and include one or both of statically defined data/metadata relationships and dynamically defined data/metadata relationships based on regular expressions.

10. A system in accordance with claim 8, wherein said metadata/metadata relationships are arbitrarily defined.

11. A system in accordance with claim 1, wherein each of said metadata containers comprises:

a context tag that defines one of said data/metadata relationships;

a hierarchy tag that defines one of said metadata/metadata relationships;

a category tag that represents an extension of said hierarchy tag and defines a category to which said metadata unit belongs;

a custom tag that defines an additional metadata/metadata relationship; and data identifying said metadata unit.

12. A system in accordance with claim 11, wherein said metadata containers are organized for searching said context tags, said hierarchy tags, said category tags and said custom tags.

13. A system in accordance with claim 11, wherein said metadata containers are organized in a database that maintains key indices on said context tags, said hierarchy tags, said category tags and said custom tags.

14. A system in accordance with claim 12, further including a navigation interface that displays said hierarchy tags and said custom tags for plural metadata containers as selectable items that can be selected to display said category tags, and wherein said category tags can be selected to display said metadata units, said source data or both.

15. A computer program product, comprising:
one or more computer useable storage media;
programming logic on said computer useable storage media for programming a data processing platform operatively coupled to a data storage device to manage source annotation metadata, as by:
maintaining a set of metadata in said storage device, said metadata comprising source data annotation information regarding source data;
maintaining data/metadata relationships, each data/metadata relationship comprising an association between an individual unit of said metadata and an individual unit of said source data;
maintaining metadata/metadata relationships, each metadata/metadata relationship comprising an association between an individual unit of said metadata and another individual unit of said metadata;
said metadata/metadata relationships defining two or more intersecting hierarchical search pathways through said metadata that each represent a respective search domain, each hierarchical search pathway starting at a top-level metadata unit associated with that search pathway, extending through a unique set of zero or more intermediate metadata units, and ending at a lower-level metadata unit representing an intersection of said hierarchical search pathways and common to each of said search domains, such that said common metadata unit can be accessed via said two or more hierarchical search pathways by searching any of said search domains starting at their respective top-level metadata units; and
each of said metadata units in said hierarchical search pathways being maintained by associated metadata containers having fields that define a data/metadata relationship between said metadata unit and a unit of said source data, and a metadata/metadata relationship between said metadata unit and another of said metadata units.

16. A computer program product in accordance with claim 15, wherein said data/metadata relationships are arbitrarily defined and include one or both of statically defined data/metadata relationships and dynamically defined data/metadata relationships based on regular expressions.

17. A computer program product in accordance with claim 15, wherein said metadata/metadata relationships are arbitrarily defined.

18. A computer program product in accordance with claim 15, wherein each of said metadata containers comprises:
a context tag that defines one or more of said data/metadata relationships;
a hierarchy tag that defines one of said metadata/metadata relationships;
a category tag that represents an extension of said hierarchy tag and defines a category to which said metadata unit belongs;
a custom tag that defines an additional metadata/metadata relationship; and
data identifying said metadata unit.

19. A computer program product in accordance with claim 18, wherein said metadata containers are organized for searching said context tags, said hierarchy tags, said category tags and said custom tags.

20. A computer program product in accordance with claim 18, wherein said metadata containers are organized in a database that maintains key indices on said context tags, said hierarchy tags, said category tags and said custom tags.

21. A computer program product in accordance with claim 18, further including providing a metadata navigation interface by displaying said hierarchy tags and said custom tags for plural metadata containers as selectable items that can be selected to display said category tags, and wherein said category tags can be selected to display said metadata units, said source data or both.

22. A method for managing source annotation information, said method being implemented by a machine operatively coupled to a storage device, said method comprising:
maintaining a set of metadata containers in said storage device, said metadata containers representing metadata for source data stored in one or more source data files;
each of said metadata containers comprising:
a context tag that defines a relationship between a portion of said source data and said metadata container;
a hierarchy tag that defines a hierarchical relationship between said metadata container and another metadata container;
a category tag that defines a metadata category associated with said hierarchy tag; and
associated metadata;
organizing said hierarchy tags of said metadata containers for searching;
generating a metadata navigation interface comprising hierarchy displays that display said hierarchy tags as selectable items that can be selected to generate category displays that display said category tags as selectable items that can be selected to generate metadata displays that display said metadata, said metadata and said source data, or said source data, depending on a user input; and
said hierarchy tags each defining part of a hierarchical search pathway through said metadata containers that each represent a respective search domain, each hierarchical search pathway starting at a top-level metadata container associated with that search pathway, extending through a unique set of zero or more intermediate metadata containers, and ending at a lower-level metadata container representing an intersection of said hierarchical search pathways and common to each of said search domains, such that said common metadata container can be accessed via said two or more hierarchical search pathways by searching any of said search domains starting at their respective top-level metadata containers.

23. A method in accordance with claim 22 wherein said navigation interface comprises a user mode for searching said metadata containers and an administrative mode for editing said metadata containers.

24. A computer program product, comprising:
one or more computer useable storage media;

programming logic on said computer useable storage media for programming a data processing platform operatively coupled to a storage device to manage source annotation metadata, as by:

maintaining a set of metadata containers in said storage device, said metadata containers representing metadata for source data stored in one or more source data files;

each of said metadata containers being associated with a storage entity comprising a unit of metadata information, and comprising:
- a context tag that associates said metadata container with an arbitrary range of said source data;
- a hierarchy tag therein that defines a hierarchical relationship between said metadata container and another metadata container; and
- a category tag that defines a metadata category associated with said hierarchy tag;

organizing said hierarchy tags for searching; and said hierarchy tags each defining part of a hierarchical search pathway through said metadata containers that each represent a respective search domain, each hierarchical search pathway starting at a top-level metadata container associated with that search pathway, extending through a unique set of zero or more intermediate metadata containers, and ending at a lower-level metadata container representing an intersection of said hierarchical search pathways and common to each of said search domains, such that said common metadata container can be accessed via said two or more hierarchical search pathways by searching any of said search domains starting a their respective top-level metadata containers.

25. A computer program product in accordance with claim 24 wherein said arbitrary ranges of source data include at least one range that is nested within another range.

* * * * *